(12) United States Patent
Kurashima

(10) Patent No.: US 8,712,028 B2
(45) Date of Patent: Apr. 29, 2014

(54) TELEPHONE RELAYING APPARATUS, TELEPHONE RELAYING METHOD, AND PROGRAM

(75) Inventor: Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 169 days.

(21) Appl. No.: 13/257,925

(22) PCT Filed: Apr. 30, 2010

(86) PCT No.: PCT/JP2010/003086
§ 371 (c)(1),
(2), (4) Date: Sep. 20, 2011

(87) PCT Pub. No.: WO2010/131432
PCT Pub. Date: Nov. 18, 2010

(65) Prior Publication Data
US 2012/0140913 A1    Jun. 7, 2012

(30) Foreign Application Priority Data

May 13, 2009    (JP) ................................ 2009-116962

(51) Int. Cl.
*H04M 3/54*         (2006.01)
(52) U.S. Cl.
USPC ................................ 379/211.02; 379/211.01
(58) Field of Classification Search
USPC ......... 379/211.02, 211.01, 212.01; 455/414.1
See application file for complete search history.

(56) References Cited

FOREIGN PATENT DOCUMENTS

| | | |
|---|---|---|
| JP | 9-46741 A | 2/1997 |
| JP | 11-205832 A | 7/1999 |
| JP | 2007013304 A | 1/2007 |
| JP | 2007013615 A | 1/2007 |
| JP | 2007150711 A | 6/2007 |
| JP | 2008301539 A | 12/2008 |
| WO | 2006003758 A | 1/2006 |
| WO | 2007123096 A | 11/2007 |

OTHER PUBLICATIONS

Japanese Office Action for JP2009-116962 mailed on Mar. 5, 2013.
International Search Report for PCT/JP2010/003086 mailed Jul. 27, 2010.

*Primary Examiner* — William Deane, Jr.
(74) *Attorney, Agent, or Firm* — Sughrue Mion, PLLC

(57) ABSTRACT

A real number and a published number are allocated to a call origination telephone terminal 100. The real number is a telephone number used in the case of directly connecting to the telephone terminal, and the published number is a number published for a third party as a telephone number of the telephone terminal. The telephone relaying apparatus 200 stores the real number and the published number in correlation with each other for each of a plurality of telephone terminals. When receiving a first call in which the real number of the call origination telephone terminal 100 is a calling number, the telephone relaying apparatus 200 reads out the published number corresponding to the real number of the call origination telephone terminal 100. The telephone relaying apparatus 200 makes a second call in which the published number of the call destination telephone terminal 300 is a calling number, and performs a relaying process between the call origination telephone terminal 100 and the call destination telephone terminal 300.

15 Claims, 28 Drawing Sheets

| PUBLISHED NUMBER (EXTENSION NUMBER) | REAL NUMBER |
|---|---|
| 3001 | 8439001 |
| 3002 | 8241233 |
| 3003 | 8234332 |
| ⋮ | ⋮ |

210

(b)

| DISTRICT NUMBER | CALLING NUMBER |
|---|---|
| 821 | 2092 |
| 8 | 2091 |
| — | 2090 |
| ⋮ | ⋮ |

(a)
```
INVITE sip:3001@192.168.1.56 SIP/2.0
Via: SIP/2.0/UDP 192.168.1.2:5060;branch=z9hG4bK3032418727
Record-Route: <sip:192.168.1.2;lr>
From: <sip:8241233@ippbx.nec.com>;tag=2cd3bf89
To: <sip:3001@ippbx.nec.com>
Call-ID: 40ec63f1@192.168.1.2
CSeq: 1059525 INVITE
Contact: <sip:8241233@192.168.1.2>
Max-Forwards: 70
Content-Length: 0
```

(b)
```
INVITE sip:8439001@192.168.1.2 SIP/2.0
Call-ID: 9f57028cc41b96ca6b858192b8a46b76@192.168.1.56
CSeq: 689 INVITE
From: <sip:3002@n-ippbx.net:5060>;tag=5566
To: <sip:8439001@n-ippbx.net:5060>
Via: SIP/2.0/UDP 192.168.1.56:5060;branch=z9hG4bK93bd4a6670ff1
Max-Forwards: 70
Content-Type: application/sdp
Contact: <sip:3002@192.168.1.56>
Content-Length: 210
```

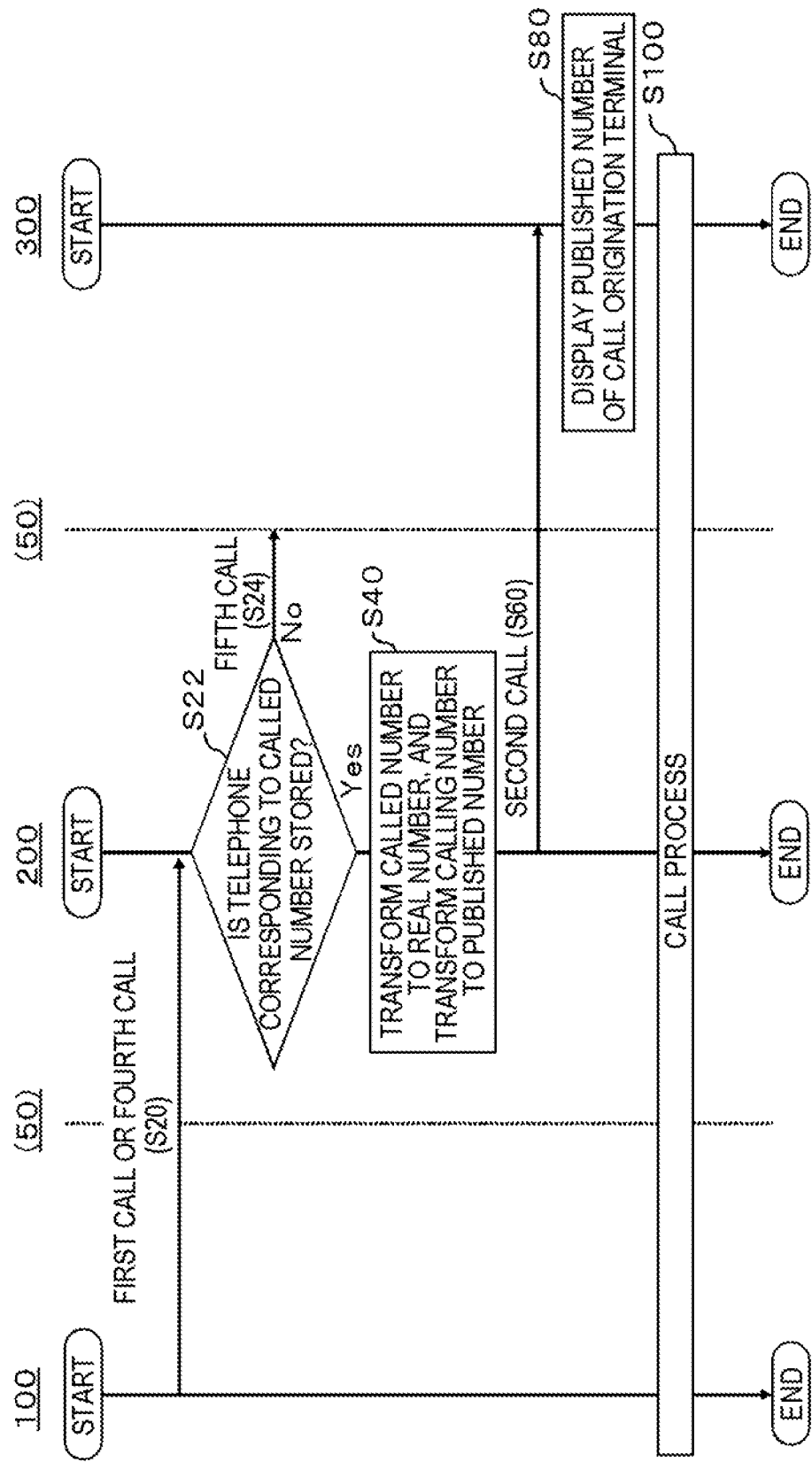

| DISTRICT NUMBER THAT IS OMITTED |
|---|
| 843 |

(b)

210

| PUBLISHED NUMBER | REAL NUMBER (CALLED NUMBER) | REAL NUMBER (CALLING NUMBER) |
|---|---|---|
| 3001 | 8439001 | 9001 |
| 3002 | 8241233 | 8241233 |
| 3003 | 8234332 | 8234332 |
| ⋮ | ⋮ | ⋮ |

FIG. 11

(a)
```
v=0
o=- 0 0 IN IP4 192.168.1.56
s=-
c=IN IP4 192.168.1.56
t=0 0
m=audio 8000 RTP/AVP 0 8 18 101
a=rtpmap:0 PCMU/8000
a=rtpmap:8 PCMA/8000
a=rtpmap:18 G729/8000
```

(b)
```
v=0
o=- 0 0 IN IP4 192.168.1.81
s=-
c=IN IP4 192.168.1.81
t=0 0
m=audio 8100 RTP/AVP 0 8 18 101
a=rtpmap:0 PCMU/8000
a=rtpmap:8 PCMA/8000
a=rtpmap:18 G729/8000
```

| PUBLISHED NUMBER | REAL NUMBER (EXTERNAL LINE) | REAL NUMBER (EXTENSION LINE) |
|---|---|---|
| 3011 | 050—××××—×××1 | 8439001 |
| 3012 | 050—××××—×××2 | 8241233 |
| 3013 | 050—××××—×××3 | 8234332 |
| ⋮ | ⋮ | ⋮ |

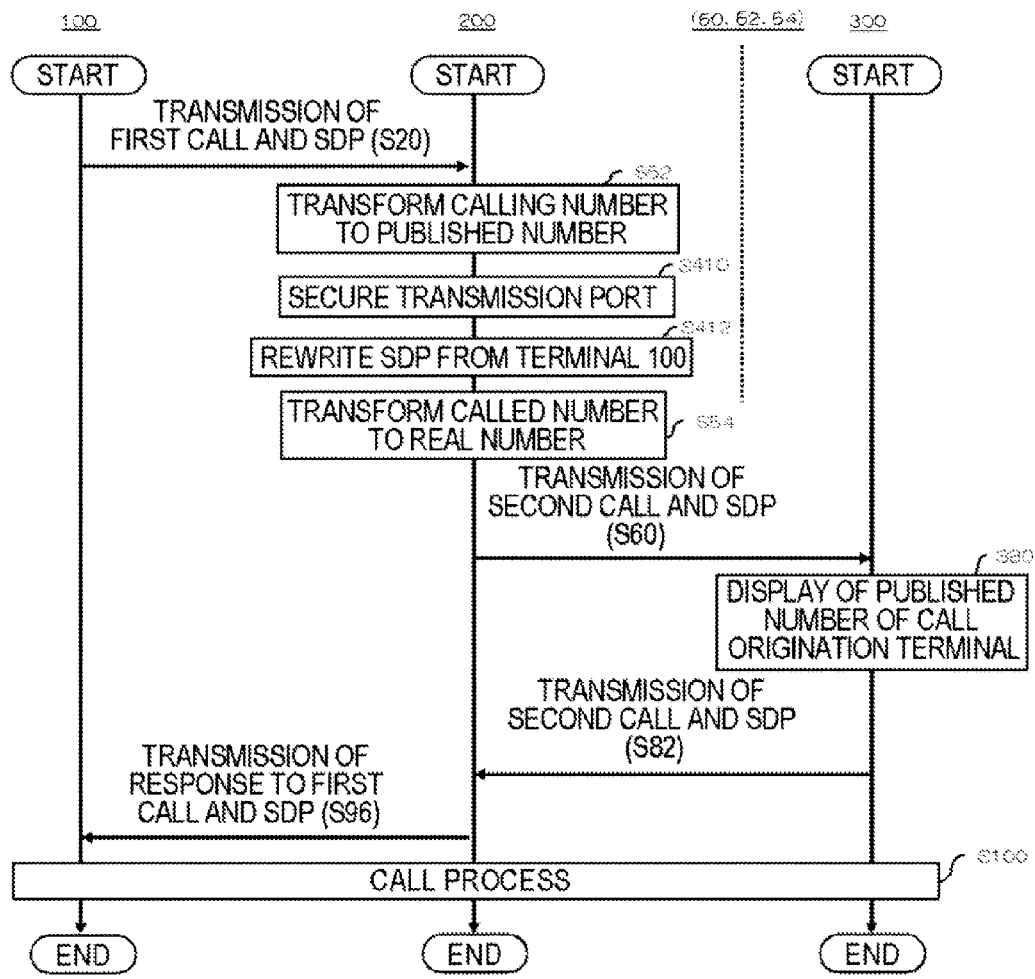

TELEPHONE RELAYING APPARATUS, TELEPHONE RELAYING METHOD, AND PROGRAM

TECHNICAL FIELD

The present invention relates to a telephone relaying apparatus, a telephone relaying method, and a program that relay a call from a call origination telephone terminal to a call destination telephone terminal.

BACKGROUND ART

In regard to an enterprise or the like that has a business location in a plurality of districts, an extension communication network is built for each business location. Each extension communication network is built by providing private branch switching equipment and by connecting a telephone terminal located in the business location to the private branch switching equipment. In addition, when each private branch switching equipment is connected to each other, it is possible to perform a call between telephone terminals belonging to business locations different from each other. An extension number allocated to the telephone terminal has a number that indicates the business location, for example, a number for specifying the private branch switching equipment to which the telephone terminal is connected.

On the other hand, there is a service in which a mobile phone is made to be used as an extension telephone by connecting an existing mobile communication network to an existing extension communication network. According to this service, the mobile communication network is treated as an independent extension communication network.

In addition, a fact that identification information of a telephone apparatus that becomes a call origination and a telephone number of the call destination are stored in the telephone relaying apparatus in advance is disclosed in Patent Document 1. When receiving a telephone call from the telephone apparatus, the telephone relaying apparatus establishes this telephone connection, reads-out a telephone number corresponding to the identification information of the telephone terminal, makes a telephone call using this telephone number, and thereby performs the telephone relaying process.

For example, a method of controlling a third party call is disclosed in a Request For Comment (RFC) 3725. According to this method, when a mobile terminal makes an instruction on a call destination to the telephone relaying apparatus through a data communication network, the telephone relaying apparatus makes a call to the call destination and the mobile terminal that made a request.

RELATED DOCUMENT

Patent Document

[Patent Document 1] International Laid-Open Publication No. 2006/003758

DISCLOSURE OF THE INVENTION

In regard to a call on an extension telephone, it is important to recognize that a call origination telephone terminal or a call destination telephone terminal belongs to which business location through an extension number. On the other hand, in a case where an existing mobile communication network is connected to an existing extension communication network, and a mobile telephone is used as an extension telephone, as described above, the mobile communication network is treated as an independent extension communication network. Therefore, in a case where a call is made from the mobile telephone to the extension telephone, an extension number displayed on the destination telephone terminal becomes a number that indicates a call from the mobile telephone. Therefore, even when a user of the mobile terminal is a person belonging to the same business location as that of a user of the destination telephone terminal, the user of the call destination telephone terminal may not recognize that the calling party is a person belonging to the same business location from the calling number displayed on the telephone terminal.

As described above, even when receiving a call from a telephone terminal belonging to a different business location, it may be necessary to show as if this call was being made by a terminal belonging to the same business location.

An object of the invention is to provide a telephone relaying apparatus, a telephone relaying method, and a program that are capable of showing as if a call was being made from a telephone terminal belonging to the same business location even when the call is made from a telephone terminal belonging to a different business location.

DESCRIPTION OF EMBODIMENTS

According to the invention, there is provided a telephone relaying apparatus including a published number storage unit that, for each of a plurality of telephone terminals, stores a real number that is a telephone number used in the case of directly connecting to the telephone terminal and a published number that is a number published for a third party as a telephone number of the telephone terminal in correlation with each other; a first reception unit that receives a first call in which the real number of the call origination telephone terminal is a calling number from a call origination telephone terminal; a number transforming unit that reads out the published number corresponding to the real number of the call origination telephone terminal from the published number storage unit; and a relaying unit that performs a second call in which the published number of the call origination telephone terminal is a calling number, and performs a relaying process between the call origination telephone terminal and the call destination telephone terminal.

According to the invention, there is provided a telephone relaying method including storing, for each of a plurality of telephone terminals, a real number that is a telephone number used in the case of directly connecting to the telephone terminal, and a published number that is a number published for a third party as a telephone number of the telephone terminal and includes a numerical string indicating that to which a user of the telephone terminal belongs, in correlation with each other; allowing a computer to receive a first call in which the real number of the call origination telephone terminal is a calling number from a call origination telephone terminal; allowing the computer to read out the published number corresponding to the real number of the call origination telephone terminal from the published number storage unit; and allowing the computer to perform a second call in which the published number of the call origination telephone terminal is a calling number, and to perform a relaying process between the call origination telephone terminal and the call destination telephone terminal.

According to the invention, there is provided a program that allows a computer to operate as a telephone relaying apparatus, in which the computer can read out information from a storage unit that, for each of a plurality of telephone terminals, stores a real number that is a telephone number used in the case of directly connecting to the telephone terminal and a published number that is a number published for a third party as a telephone number of the telephone terminal and includes a numerical string indicating that to which a user of the telephone terminal belongs, in correlation with each other, the program allowing the computer to execute a function of receiving a first call in which the real number of the call origination telephone terminal is a calling number from a call origination telephone terminal; a function of reading out the published number corresponding to the real number of the call origination telephone terminal from the storage unit; a function of performing a second call in which the published number of the call origination telephone terminal is a calling number, and performing a relaying process between the call origination telephone terminal and the call destination telephone terminal.

According to the invention, it is possible to show as if a call was being made from a telephone terminal belonging to the same business location even when the call is made from a telephone terminal belonging to a different business location.

BRIEF DESCRIPTION OF THE DRAWINGS

The above and other objects, advantages and features of the present invention will be more apparent from the following description of certain preferred embodiments taken in conjunction with the accompanying drawings.

FIG. 3 is a diagram illustrating data stored in a published number storage unit in a table format.

FIG. 5(*a*) is a diagram illustrating an example of an SIP of a first call, and FIG. 5(*b*) is a diagram illustrating an example of an SIP of a second call.

FIG. 6 is a flow chart of a relaying process using a telephone relaying apparatus according to a second embodiment.

FIG. 7 is a diagram illustrating a data configuration of a published number storage unit of a telephone relaying apparatus according to a third embodiment in a table format.

FIG. 11(*a*) is a diagram illustrating an example of an SDP before the rewriting in step S412 of FIG. 10, and FIG. 11(*b*) is a diagram illustrating an example of an SDP after the rewriting in step S412 of FIG. 10.

FIG. 25 is a diagram illustrating data that a published number storage unit 210 of a telephone relaying apparatus stores in a table format.

FIG. 28 is a flow chart illustrating a third example of a telephone relaying process using a telephone relaying apparatus shown in FIG. 24.

Hereinafter, embodiment of the invention will be described with reference to the accompanying drawings. In addition, in all drawings, like reference numerals will be given to like parts having the same functions, and description thereof will not be repeated.

FIG. 1 shows a diagram illustrating a usage environment of a telephone relaying apparatus 200 according to a first embodiment. This telephone relaying apparatus 200 is an apparatus that performs a relaying process between a call origination telephone terminal 100 and a call destination telephone terminal 300. A real number and a published number are allocated to the call origination telephone terminal 100. The real number is a telephone number used in the case of directly connecting to the telephone terminal, and the published number is a number published for a third party as a telephone number of the telephone terminal. The telephone relaying apparatus 200 stores the real number and the published number in correlation with each other for each of a plurality of telephone terminals.

Figure 1:
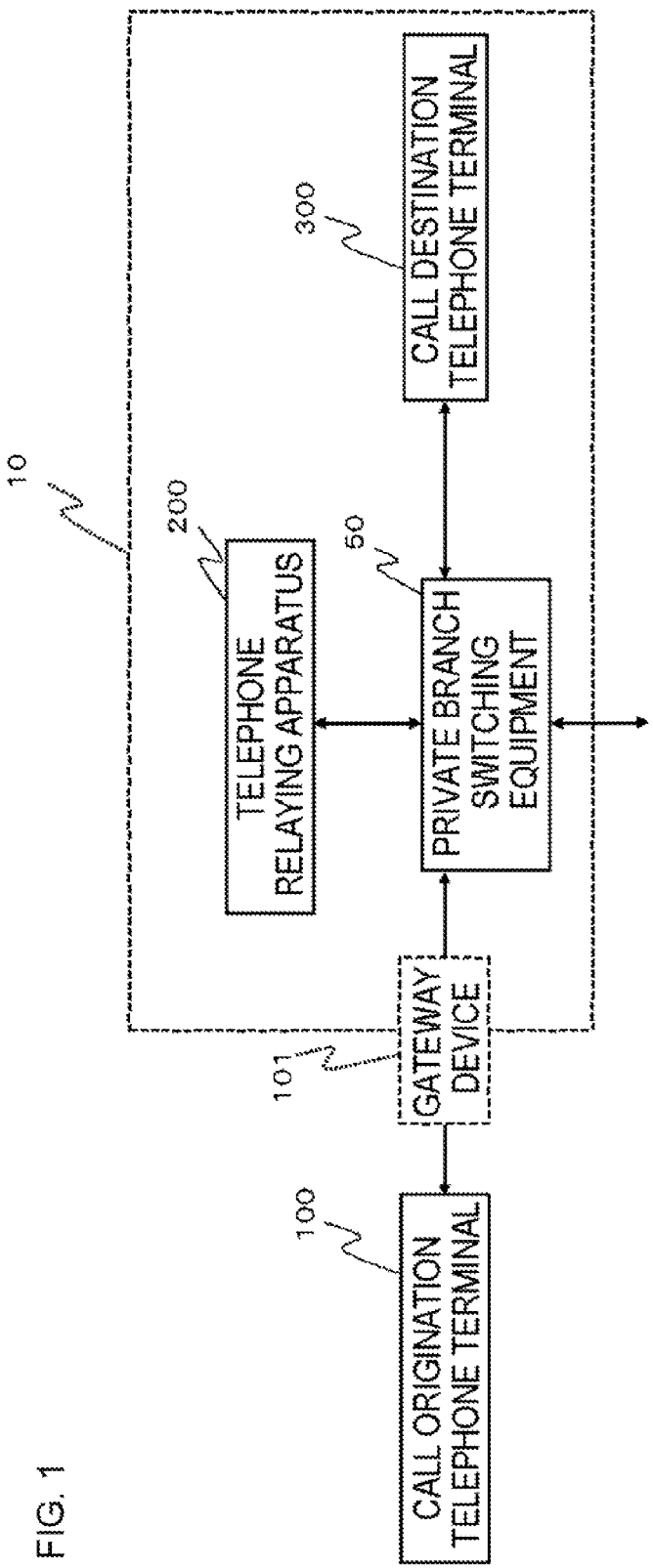
FIG. 1 is a diagram illustrating a usage environment of a telephone relaying apparatus related to a first embodiment.

When receiving a first call in which a real number of the call origination telephone terminal 100 is a calling number from the call origination telephone terminal 100, the telephone relaying apparatus 200 reads out a published number corresponding to the real number of the call origination telephone terminal 100. In addition, the telephone relaying apparatus 200 makes a second call in which the published number of the call origination telephone terminal 100 is a calling number, and performs a relaying process between the call origination telephone terminal 100 and the call destination telephone terminal 300.

In an example shown in this drawing, the call origination telephone terminal 100 and the call destination telephone terminal 300 are connected to the telephone relaying apparatus 200 through private branch switching equipment 50 that performs a connection process of the telephone terminal. The telephone relaying apparatus 200 and the private branch switching equipment 50 are located within one extension communication network 10. The call origination telephone terminal 100 and the call destination telephone terminal 300 may be located within or outside the extension communication network 10. In the example shown in FIG. 1, the call origination telephone terminal 100 is connected to the private branch switching equipment 50 through a gateway device 101. However, the published number of the call origination telephone terminal 100 is a number that is effective within the extension communication network 10 similarly to the published number of the call destination telephone terminal 300. Therefore, the call origination telephone terminal 100 is treated to be apparently located within the extension communication network 10.

As described above, the call origination telephone terminal 100 may be located within the same extension communication network as that of the call destination telephone terminal 300. In this case, the gateway device 101 is not necessary. In addition, the call destination telephone terminal 300 may be located at the outside of the extension communication network 10 and be connected to the extension communication network 10 through the gateway device 101.

In addition, the call origination telephone terminal 100 and the call destination telephone terminal 300 may be an IP telephone or a common telephone.

Figure 2:
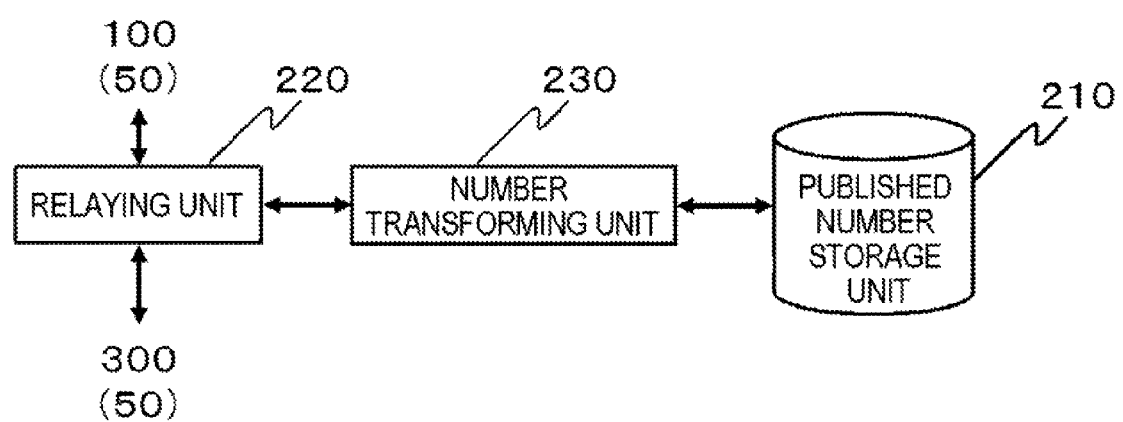
FIG. 2 is a block diagram illustrating a functional configuration of the telephone relaying apparatus.

FIG. 2 shows a block diagram illustrating a functional configuration of the telephone relaying apparatus 200. The telephone relaying apparatus 200 includes a published number storage unit 210, a relaying unit 220, and a number transforming unit 230. The published number storage unit 210 stores the real number and the published number in correlation with each other for each of a plurality of telephone terminals. The relaying unit 220 also functions as a first reception unit and receives a first call in which the real number of the call origination telephone terminal 100 is a real number from the call origination telephone terminal 100. The number transforming unit 230 reads out the published number corresponding to the real number of the call origination telephone terminal 100 from the published number storage unit 210. The relaying unit 220 makes a second call in which the published number of the call origination telephone terminal 100 is a calling number, and performs a relaying process between the call origination telephone terminal 100 and the call destination telephone terminal 300.

In addition, a called number of the first call may be a number that is managed in the published number storage unit 210 as the published number. In this case, the number transforming unit 230 reads out the real number corresponding to this published number from the published number storage unit 210. The relaying unit 220 sets this real number as the called number in a second call.

As shown in FIG. 1, the telephone relaying apparatus 200 is connected to the call origination telephone terminal 100 and the call destination telephone terminal 300 through the private branch switching equipment 50. Therefore, the relaying unit 220 receives a first call through the private branch switching equipment 50, makes a second call with respect to the private branch switching equipment 50, and thereby performs a relaying process between the call origination telephone terminal 100 and the call destination telephone terminal 300.

In addition, in FIG. 2, a configuration of a part not related to the invention in essence is omitted. Each component of the telephone relaying apparatus 200 shown in FIG. 2 is not a hardware unit configuration but a functional unit block. Each component of the telephone relaying apparatus 200 is realized by an arbitrary combination of hardware and software that mainly includes a CPU and a memory of an arbitrary computer, a program realizing components shown in this drawing, a storage unit such as a hard disk storing the program, and an interface for a network connection. In addition, it should be understood by those skilled in the art that various modifications may be made in regard to the realizing method and device.

FIGS. 3($a$) and 3($b$) show diagrams illustrating data stored in the published number storage unit 210 in a table format. The published number storage unit 210 stores both data shown in FIGS. 3($a$) and 3($b$). As described above, the published number storage unit 210 stores the published number and the real number in correlation with each other. In the example shown in FIG. 3, it is indicated that each published number is in the 3000s, and a telephone terminal is present in the same extension communication network 10. In addition, the real number includes a district number and a calling number that are arranged in this order. The district number is a numerical string indicating that to which a user of the telephone terminal belongs.

FIG. 3($b$) shows a diagram illustrating information correlated with a calling number which the published number storage unit 210 stores in a table format. In this example, an upper partial numerical string (district number) of a calling number in a first call and a calling number in a second call that corresponds to this numerical string are divided and are stored.

Figure 4:
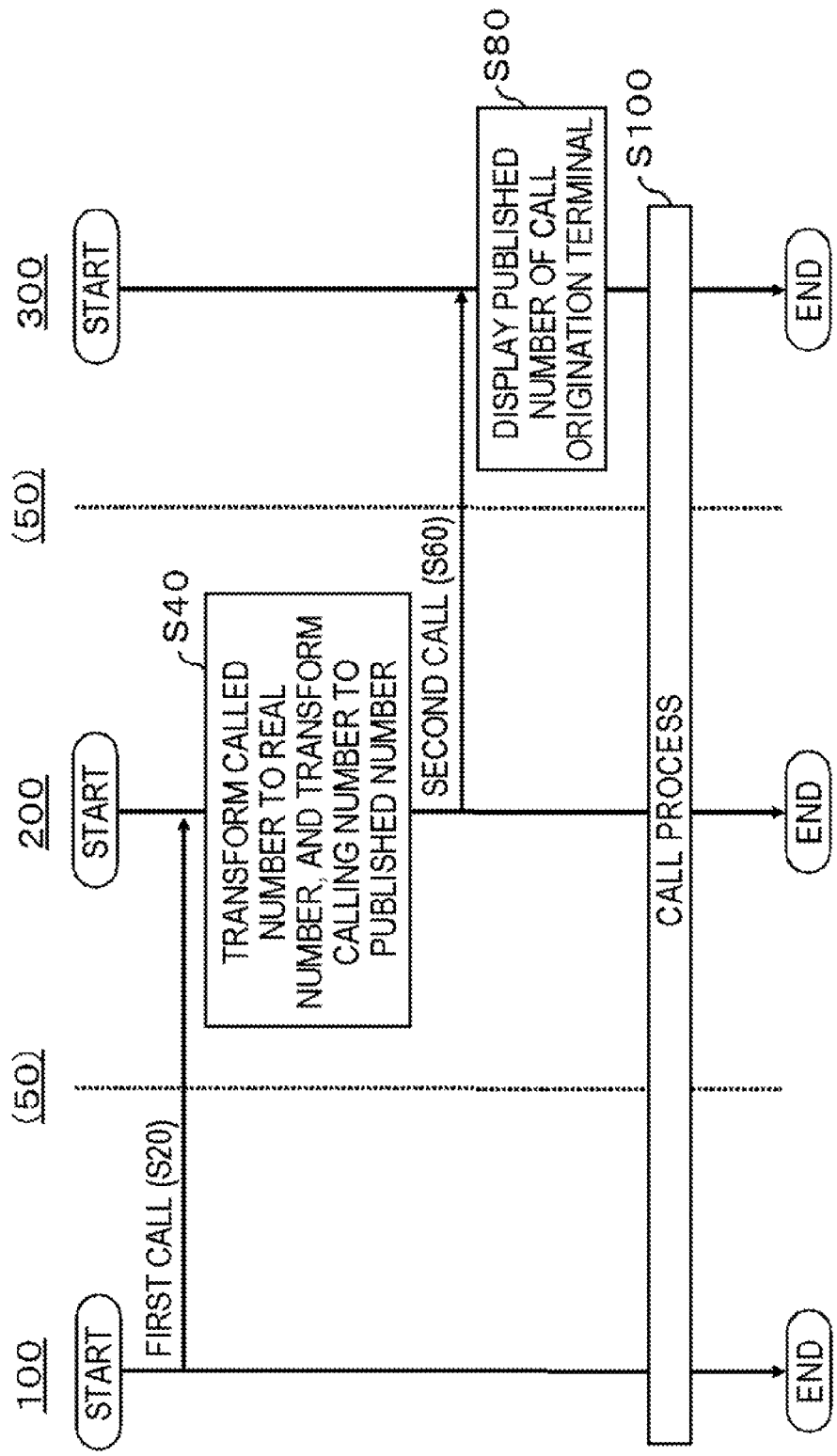
FIG. 4 is a flowchart illustrating an operation of the telephone relaying apparatus in an environment shown in FIG. 1.

FIG. 4 shows a flow chart illustrating an operation of the telephone relaying apparatus 200 in the environment shown in FIG. 1. First, the call origination telephone terminal 100 makes a first call with respect to the telephone relaying apparatus 200 (step S20). In the first call, a calling number is the real number of the call origination telephone terminal 100 and a called number is a published number of the call destination telephone terminal 300.

The relaying unit 220 of the telephone relaying apparatus 200 receives the first call through the private branch switching equipment 50. The number transforming unit 230 reads out the published number from the published number storage unit 210, the published number corresponds to the real number of the call origination telephone terminal 100 which the relaying unit 220 receives, and the umber transforming unit 230 reads out the real number from the published number storage unit 210, the real number corresponds to the published number of the call destination telephone terminal 300 which the relaying unit 220 receives (step S40). In addition, the number transforming unit 230, first, tries a process shown in step S40 by using data shown in FIG. 3($a$). In a case where a necessary number is not included in the data shown in FIG. 3($a$), the number transforming unit 230 tries a process shown in step S40 by using data in FIG. 3($b$). More specifically, the number transforming unit 230 confirms a calling number of the first call and when a numerical string (district number), which coincides with an upper place of the calling number, is included in the data shown in FIG. 3($b$), reads out a calling number corresponding to the numerical string. In addition, the number transforming unit 230 reads out the real number from the published number storage unit 210, the real number corresponds to the published number of the call destination telephone terminal 300 which the relaying unit 220 receives. The relaying unit 220 makes a second call to the call destination telephone terminal 300 through the private branch switching equipment 50 (step S60). The second call is made from, for example, a line that transmits a callusing a calling number read-out in step S40, and the real number of the call destination telephone terminal 300 is set as a called number.

When receiving the second call, the call destination telephone terminal 300 displays the published number of the call origination telephone terminal 100 (step S80). When a user makes an input indicating a response to the second call, the call destination telephone terminal 300 performs a telephone connection with the relaying unit 220 of the telephone relaying apparatus 200. Then, the relaying unit 220 performs a telephone connection with the call origination telephone terminal 100. In this manner, the relaying unit 220 of the telephone relaying apparatus 200 performs a relaying process between the call origination telephone terminal 100 and the call destination telephone terminal 300 (step S100). In this manner, the call origination telephone terminal 100 and the call destination telephone terminal 300 can perform a call. In addition, before the process shown in step S60, the relaying unit 220 may perform a telephone connection with the call origination telephone terminal 100 in the process shown in step S100.

FIG. 5(a) shows an example of a Session Initiation Protocol (SIP) message which the relaying unit 220 of the telephone relaying apparatus 200 receives in the first call in regard to the a case where the call origination telephone terminal 100 and the call destination telephone terminal 300 are IP telephones. In the example shown in this drawing, the published number of the call origination telephone terminal 100 is 3002, and the real number is 8241233. In addition, the published number of the call destination telephone terminal 300 is 3001, and the real number is 8439001.

As shown in this drawing, a calling number of the first call is 8231233 that is the real number of the call origination telephone terminal 100, and the called number of the first call is 3001 that is the published number of the call destination telephone terminal 300.

FIG. 5(b) shows an example of the SIP message which the relaying unit 220 of the telephone relaying apparatus 200 transmits in the second call. As shown in this drawing, the calling number of the second call is transformed to 3002 that is the published number of the call origination telephone terminal 100, and the called number of the second call is transformed to 8439001 that is the real number of the call destination telephone terminal 300.

Next, an operation and an effect of this embodiment will be described. According to this embodiment, when the call origination telephone terminal 100 makes a first call with respect to the call destination telephone terminal 300 with the real number of the call origination telephone terminal 100 set as a calling number, the telephone relaying apparatus 200 makes a second call with respect to the call destination telephone terminal 300 with the published number of the call origination telephone terminal 100 set as a calling number, and performs a relaying process between the call origination telephone terminal 100 and the call destination telephone terminal 300. Therefore, the published number of the call origination telephone terminal 100 is displayed on the call destination telephone terminal 300. Therefore, even when the call origination telephone terminal 100 belongs to a business location different from that of the call destination telephone terminal 300, it is possible to show, with respect to the user of the call destination telephone terminal 300, as if the user of the call origination telephone terminal 100 belonged to the same business location as that of himself.

In addition, even when the published number of the call destination telephone terminal 300 is input to the call origination telephone terminal 100 and the published number of the call destination telephone terminal 300 is used as the called number of the first call, the number transforming unit 230 of the telephone relaying apparatus 200 transforms the published number of the call destination telephone terminal 300 to the real number of the call destination telephone terminal 300. Therefore, it is possible to show, with respect to the user of the call origination telephone terminal 100, as if the user of the call destination telephone terminal 300 belonged to the same business location as that of himself.

FIG. 6 shows a flow chart of a relaying process using a telephone relaying apparatus 200 according to a second embodiment, and corresponds to FIG. 4 in regard to the first embodiment. A functional configuration and a usage environment of the telephone relaying apparatus 200 are the same as those of the first embodiment, and therefore the description thereof will not be repeated.

In this embodiment, the call origination telephone terminal 100 transmits a first call or a fourth call to the relaying unit 220 of the telephone relaying apparatus 200. The first call is the same as that of the first embodiment. The fourth call sets the real number of the call origination telephone terminal as a calling number, and sets a non-managed telephone number that is not stored in the published number storage unit 210 as a called number (step S20).

When the call which the relaying unit 220 receives is the first call, and the published number storage unit 210 stores a telephone number corresponding to the called number included in the call as the published number (Yes in step S22), the relaying unit 220 and the number transforming unit 230 perform the same processes as those of the first embodiment (step S40 to step S100).

In addition, when the call which the relaying unit 220 receives is the fourth call, and the published number storage unit 210 does not store a telephone number corresponding to the called number included in the call as the published number (No in step S22), the number transforming unit 230 transmits information indicating this to the relaying unit 220 and reads out the published number corresponding to the real number of the call origination telephone terminal 100 from the published number storage unit 210. The relaying unit 220 makes a fifth call in which the non-managed telephone number is a called number, and the published number of the call origination telephone terminal 100 is a calling number with respect to the private branch switching equipment 50 (step S24).

According to this embodiment, it is also possible to obtain the same effect as that of the first embodiment. In addition, even when the call origination telephone terminal 100 makes a call to an external telephone terminal, it is possible to perform a call with this telephone terminal.

FIG. 7 is a diagram illustrating a data configuration of the published number storage unit 210 of the telephone relaying apparatus 200 according to a third embodiment in a table format. In an example shown in this drawing, as shown in FIG. 7(b), the published number storage unit 210 stores the real number that is to be used as a calling number in regard to the first call, and the real number that is to be used as a called number in regard to the second call, respectively. Specifically, in a part of the real number that is to be used as the calling number in regard to the first call, a district number is omitted. As shown in FIG. 7(a), the published number storage unit 210 stores the district number that may be omitted.

In addition, another functional configuration and usage environment of the telephone relaying apparatus 200 is the same as that of the first embodiment or the second embodiment. In addition, the relaying process using the telephone relaying apparatus 200 according to this embodiment is the same as that of the first embodiment or the second embodiment except for the details of step S40 in FIG. 4.

Figure 8:
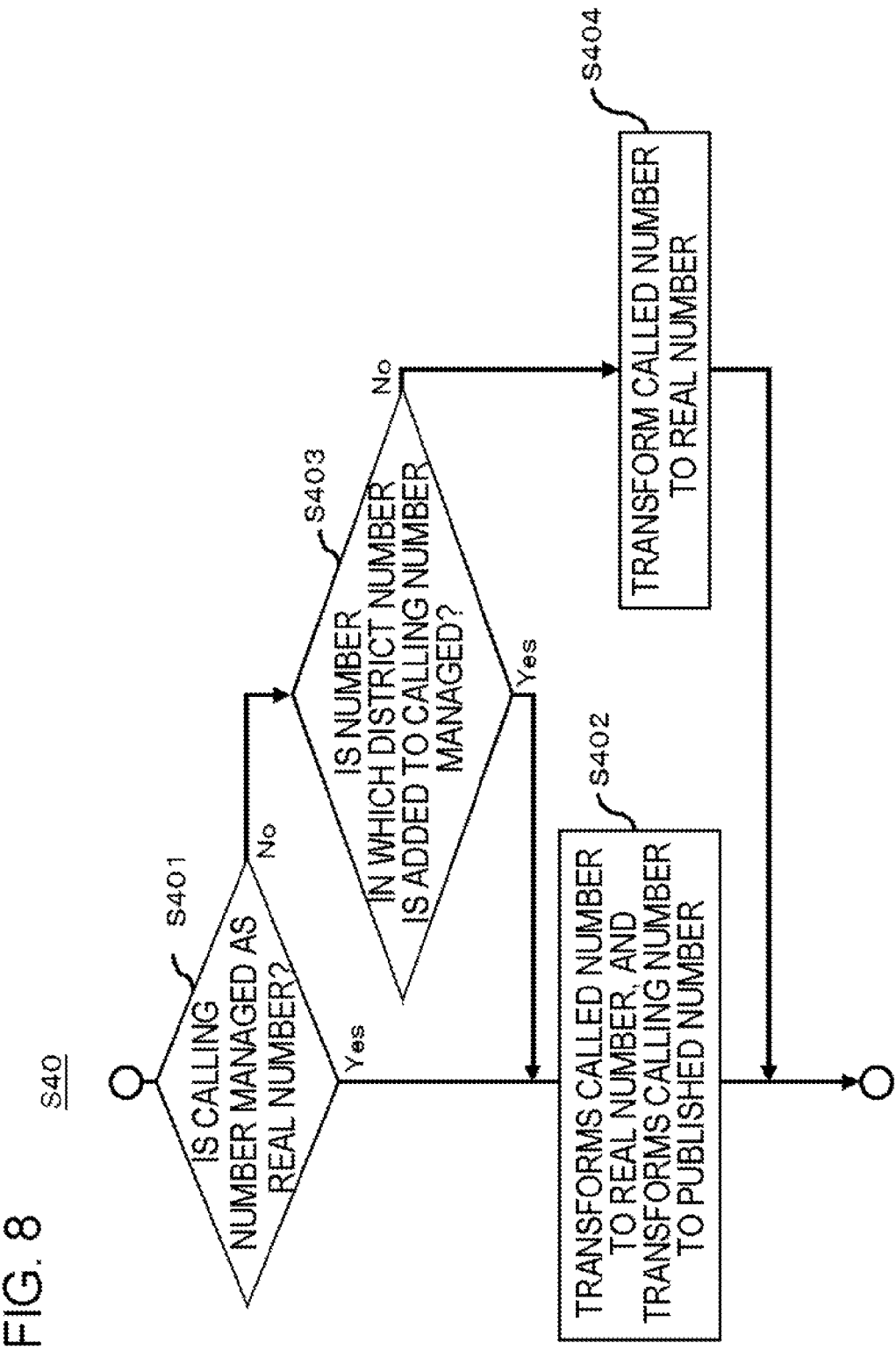
FIG. 8 is a flowchart illustrating the details of step S40 in this embodiment.

FIG. 8 shows a flow chart illustrating the details of step S40 in this embodiment. First, in a case where a calling number of a first call is managed in the published number storage unit 210 as the real number (Yes in step S401), the number transforming unit 230 transforms the published number of the call destination telephone terminal 300, which is a called number of the first call, to the real number of the call destination telephone terminal 300, and transforms the real number of the call origination telephone terminal 100, which is a calling number of the first call, to the published number of the call origination telephone terminal 100 (step S402).

In a case where the calling number of the first call is not managed as the real number in the published number storage unit 210 (No in step S401), the number transforming unit 230 reads out a number stored in the published number storage unit 210 as a district number that may be omitted. Then, the number transforming unit 230 adds the read-out number to the front of the calling number of the first call. In a case where the number after the addition is managed in the published number storage unit 210 as the real number (Yes in step S403), the number transforming unit 230 performs a process shown in step S402. In addition, in a case where the number after the addition is managed in the published number storage unit 210 as the real number (No in step S403), the number transforming unit 230 transforms the published number of the call destination telephone terminal 300 that is the called number of the first call to the real number, but maintains the calling number of the first call as a calling number of a second call (step S404).

The relaying unit makes the second call with respect to the private branch switching equipment 50 (step S60 in FIG. 4).

According to this embodiment, it is also possible to obtain the same effect as that of the first embodiment or the second embodiment.

Figure 9:
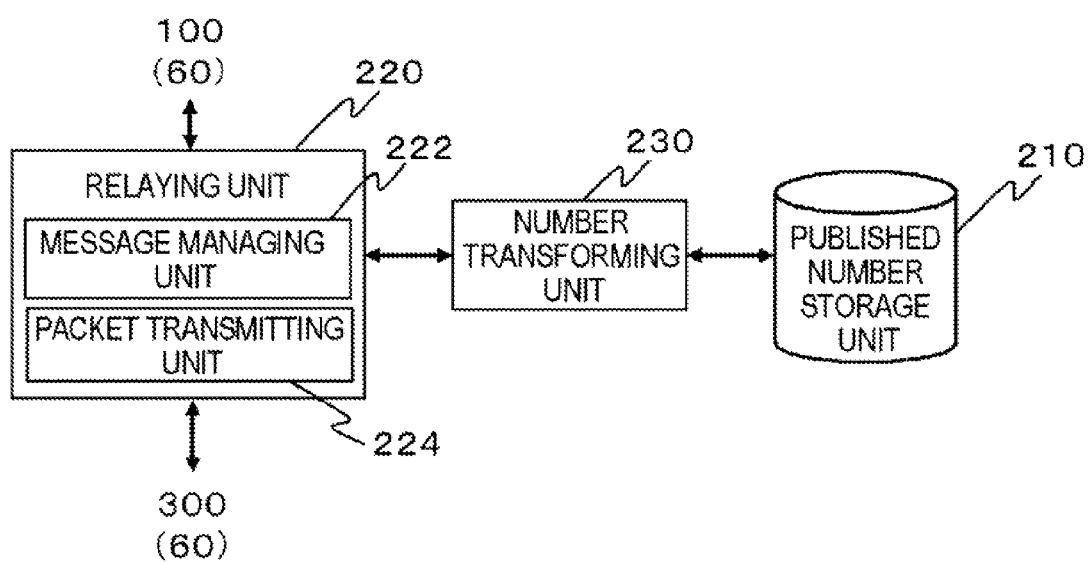
FIG. 9 is a block diagram illustrating a functional configuration of a telephone relaying apparatus according to a fourth embodiment.

FIG. 9 shows a block diagram illustrating a functional configuration of a telephone relaying apparatus 200 according to a fourth embodiment, and corresponds to FIG. 2 in the first embodiment. The telephone relaying apparatus 200 has the same configuration as that of the telephone relaying apparatus 200 according to any one of the first embodiment to third embodiment except that the relaying unit 220 has a message processing unit 222 and a packet transmitting unit 224.

The message processing unit 222 has a function of processing a call made from a common telephone, and the packet transmitting unit 224 has a function of processing a call made from an IP telephone.

Figure 10:
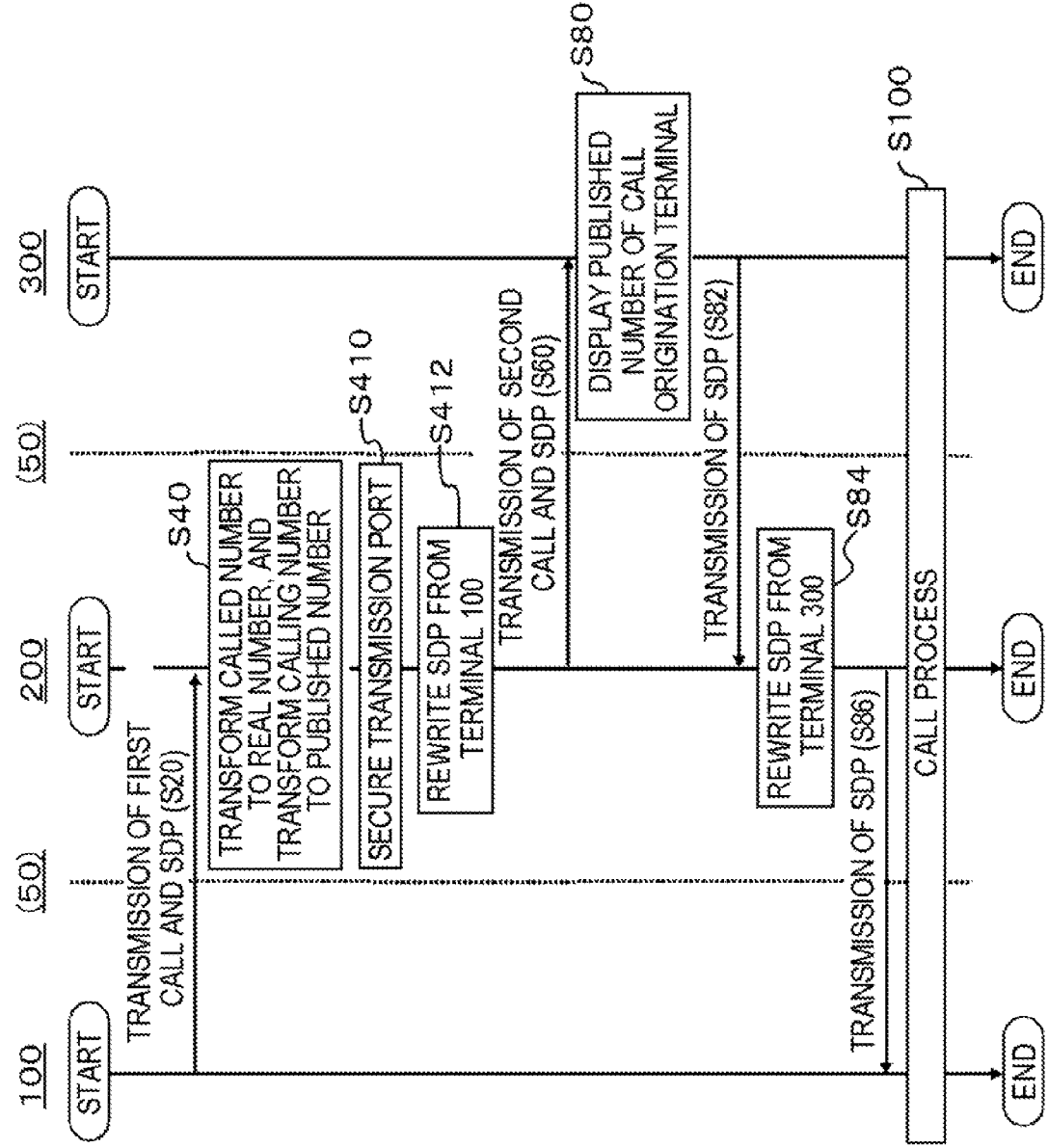
FIG. 10 is a flow chart of a relaying process using a telephone relaying apparatus.

FIG. 10 shows a flow chart of a relaying process using a telephone relaying apparatus 200 in a case where the call origination telephone terminal 100 and the call destination telephone terminal 300 are IP telephones. First, the call origination telephone terminal 100 transmits the first call and a Session Description Protocol (SDP) to the telephone relaying apparatus 200 through the private branch switching equipment 50 (step S20).

The number transforming unit 230 of the telephone relaying apparatus 200 transforms the published number of the call destination telephone terminal 300 that is a called number of the first call to the real number of the call destination telephone terminal 300, and transforms the real number of the call origination telephone terminal 100 that is a calling number of the first call to the published number of the call origination telephone terminal 100 (step S40). The packet transmitting unit 224 of the relaying unit 220 secures a port for a voice packet transmission from empty ports (step S410). The packet transmitting unit 224 rewrites the SDP that is received from the call origination telephone terminal 100 such that the voice packet will be transmitted through the transmission port secured in step S410 (step S412). The packet transmitting unit 224 transmits the second call and the SDP rewritten in step S412 to the call destination telephone terminal 300 through the private branch switching equipment 50 (step S60).

When receiving a second call, the call destination telephone terminal 300 displays the published number of the call origination telephone terminal 100 (step S80). When a user makes an input indicating the response to the second call, the call destination telephone terminal 300 transmits the SDP with respect to the packet transmitting unit 224 of the telephone relaying apparatus 200 (step S82). A port for receiving the voice packet by the call destination telephone terminal 300 is designated to the SDP. The packet transmitting unit 224 rewrites the SDP that is received from call destination telephone terminal 300 such that the voice packet will be transmitted through the transmission port secured in step S410 (step S84). The packet transmitting unit 224 transmits the SDP rewritten the port to the call origination telephone terminal 100 (step S86). The packet transmitting unit 224 of the telephone relaying apparatus 200, the call origination telephone terminal 100, and the call destination telephone terminal 300 perform a process for a call (step S100). At this time, the telephone relaying apparatus 200 may make it different the port used for the packet transmission from the first call to the second call, and the port for the packet transmission from the second call to the first call.

FIG. 11(a) shows an example of the SDP before the rewriting in step S412 in FIG. 10, and FIG. 11(b) shows an example of the SDP after the rewriting in step S412. In these examples, the transmission port is rewritten from a port 8000 of "192.168.1.56" to a port 8100 of "192.168. 1.81".

According to this embodiment, it is also possible to obtain the same effect as that of any one of the first embodiment to the third embodiment.

In addition, in this embodiment, in a case where the call origination telephone terminal 100 and the call destination telephone terminal 300 are IP telephones, the packet transmitting unit 224 of the relaying unit 220 may relay voice data, in step S100, between the call origination telephone terminal 100 and the call destination telephone terminal 300 without through the private branch switching equipment 50 after the communication between the call origination telephone terminal 100 and the call destination telephone terminal 300 is established. For example, in a case where an IP address of the call origination telephone terminal 100 is included in the SDP transmitted from the call origination telephone terminal 100 and an IP address of the call destination telephone terminal 300 is included in the SDP transmitted from the call destination telephone terminal 300, the packet transmitting unit 224 recognizes these IP addresses, and can relay the voice data between the call origination telephone terminal 100 and the call destination telephone terminal 300 without through the private branch switching equipment 50.

Figure 12:
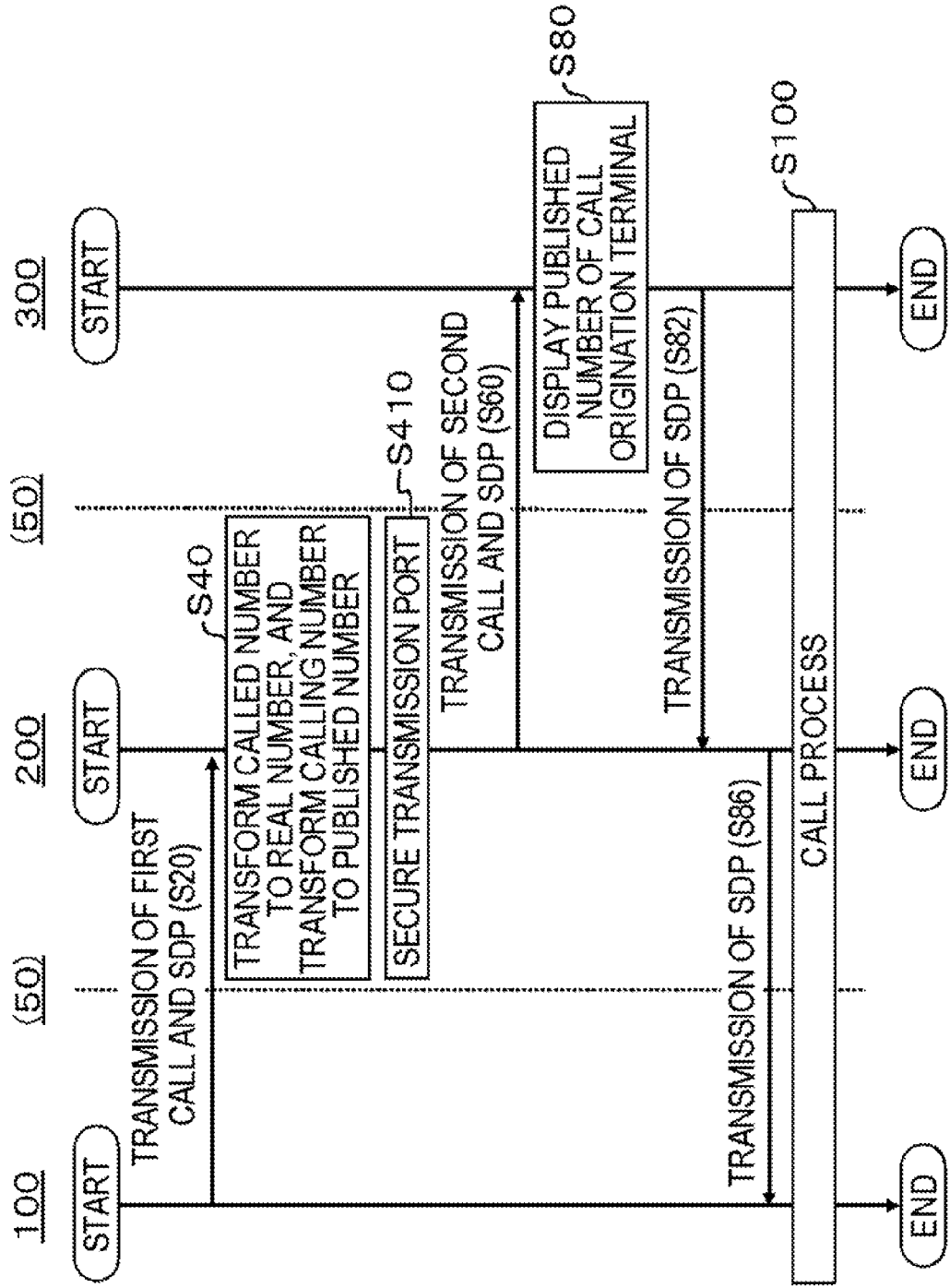
FIG. 12 is a flow chart illustrating a modification of FIG. 10.

In addition, as shown in FIG. 12, step S412 and step S84 may be omitted, and the rewriting process of the SDP may not be performed. In this case, the SDP transmitted from the call origination telephone terminal 100 is transmitted to the call destination telephone terminal 300 as it is, and the SDP transmitted from the call destination telephone terminal 300 is transmitted to the call origination telephone terminal 100 as it is. In this case, the call origination telephone terminal 100 and the call destination telephone terminal 300 can recognize the IP address of the counterpart, such that the call origination telephone terminal 100 and the call destination telephone terminal 300 may perform transmission and reception of a voice stream with peer-to-peer to each other.

Figure 13:
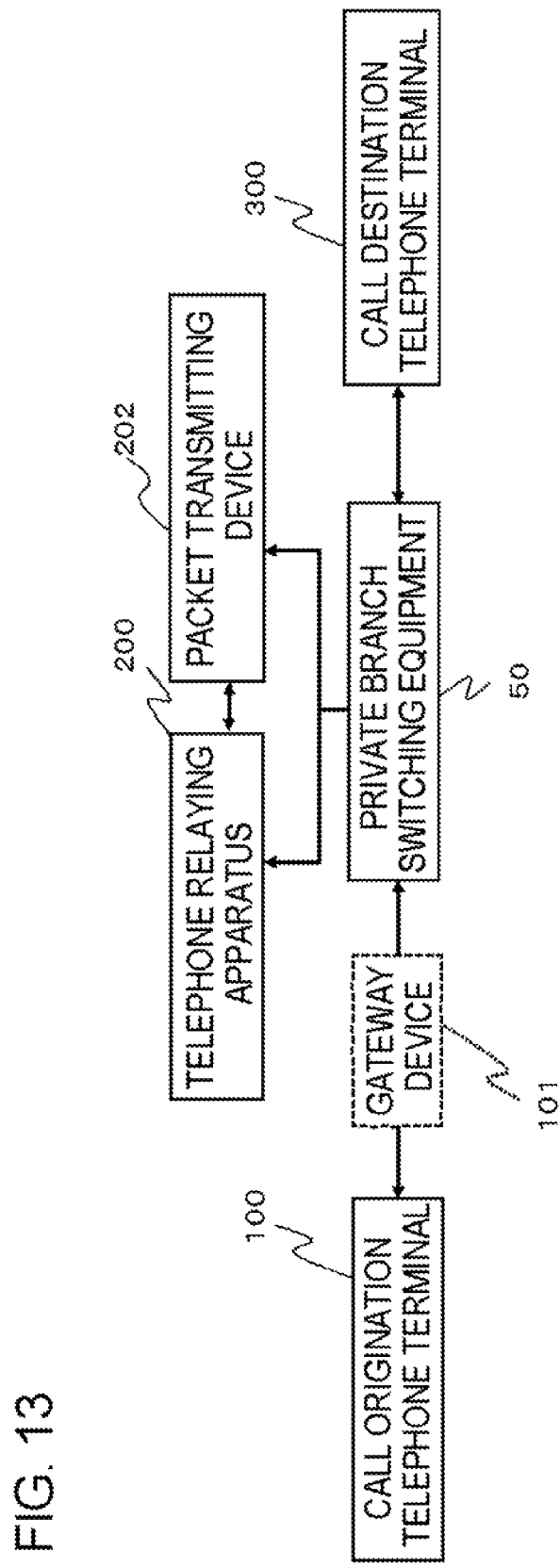
FIG. 13 is a block diagram illustrating a functional configuration of a telephone relaying system according to fifth embodiment.

FIG. 13 shows a block diagram illustrating a functional configuration of a telephone relaying system according to fifth embodiment. This telephone relaying system includes the telephone relaying apparatus 200 shown in the fourth embodiment and the packet transmitting device 202. The packet transmitting device 202 is connected to the private branch switching equipment 50 and the number transforming unit 230 of the telephone relaying apparatus 200. A process performed by the packet transmitting device 202 is the same as the process performed by the packet transmitting unit 224 of the telephone relaying apparatus 200 according to the fourth embodiment. In this embodiment, the telephone relaying apparatus 200 also includes the message processing unit 222 and the packet transmitting unit 224.

That is, in this embodiment, a plurality of units for performing a transmission process of a voice packet is provided. According to this embodiment, it is also possible to obtain the same effect as that of the fourth embodiment. In addition, the relaying unit 220 of the telephone relaying apparatus 200 may be provided with a plurality of packet transmitting units 224 instead of being provided with the packet transmitting device 202.

Figure 14:
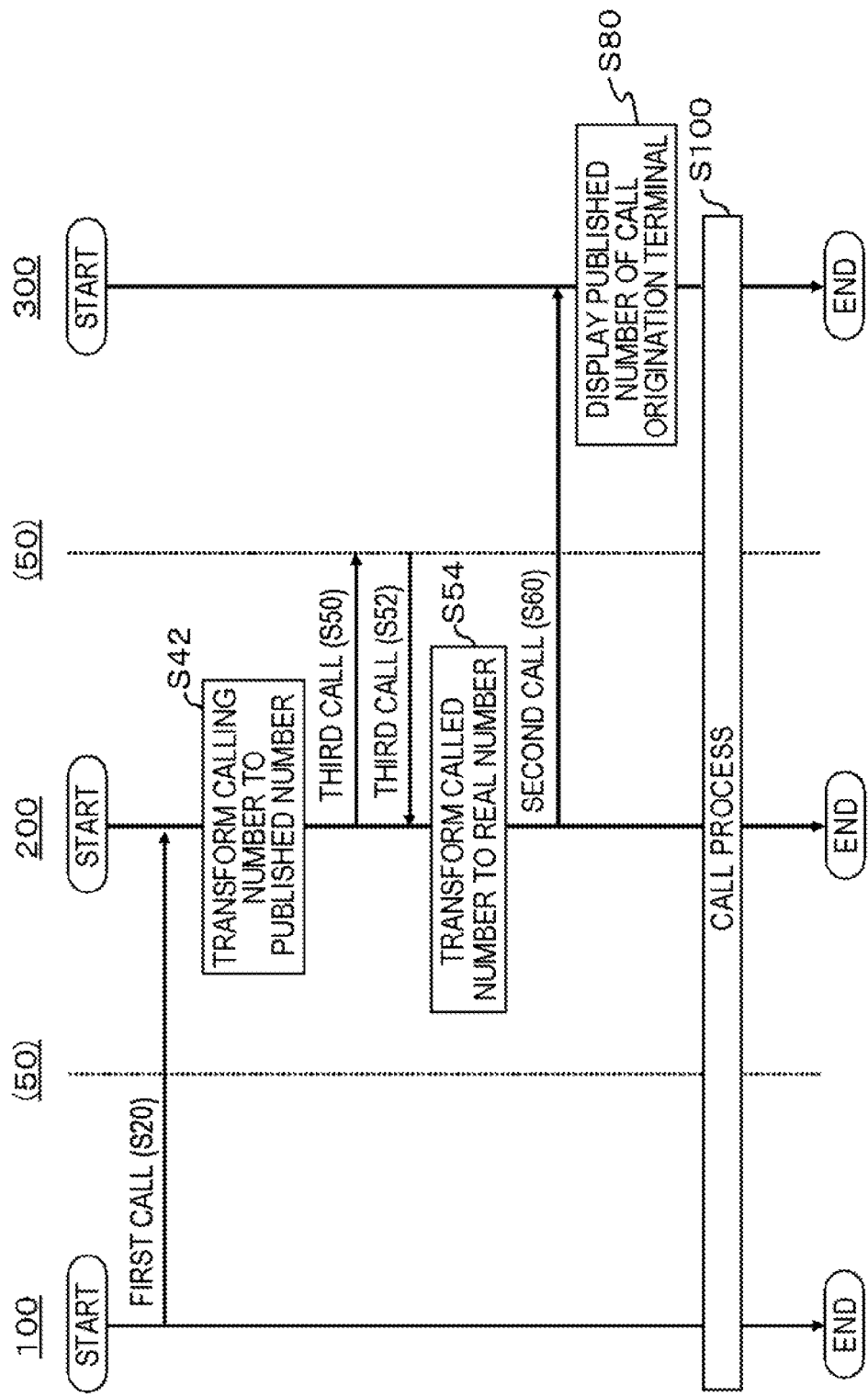
FIG. 14 is a flow chart illustrating the details of a relaying process using a telephone relaying apparatus according to a sixth embodiment.

FIG. 14 is a flow chart illustrating the details of a relaying process using a telephone relaying apparatus 200 according to a sixth embodiment. A functional block diagram of the telephone relaying apparatus 200 according to this embodiment is the same as that of any one of the first embodiment to the fifth embodiment. In addition, FIG. 14 illustrates a case where a function of the telephone relaying apparatus 200 is the same as that of the first embodiment.

The call origination telephone terminal 100 makes a first call with respect to the telephone relaying apparatus 200 (step S20). In regard to the first call, a calling number is the real number of the call origination telephone terminal 100 and a called number is the published number of the call destination telephone terminal 300.

The number transforming unit 230 of the telephone relaying apparatus 200 reads out the published number of the call origination telephone terminal 100 from a published number storage unit by using the real number of the call origination telephone terminal 100, which is included in the first call which the relaying unit 220 receives, and transforms the calling number (step S42). The relaying unit 220 makes a third call in which the published number of the call destination telephone terminal 300 is a called number and the published number of the call origination telephone terminal 100 is a calling number with respect to the private branch switching equipment 50 (step S50). The private branch switching equipment 50 refers to the called number of the third call and returns the third call to the telephone relaying apparatus 200 (step S52).

The relaying unit 220 of the telephone relaying apparatus 200 receives the third call that is returned by the private branch switching equipment 50. The number transforming unit 230 of the telephone relaying apparatus 200 reads out the real number of the call destination telephone terminal 300 from the published number storage unit by using the published number, which is included in the third call which the relaying unit 220 receives, of the call destination telephone terminal 300, and transforms the called number (step S54). In addition, the relaying unit 220 makes a second call (step S60). The subsequent processes are the same as those of any one of the first embodiment to the fifth embodiment.

According to this embodiment, it is also possible to obtain the same effect as that of the first embodiment. In addition, the number transforming unit 230 and the relaying unit 220 separately perform a process necessary in the case of making a call and a process necessary in the case of receiving a call. Therefore, in regard to a case where the call origination telephone terminal 100 makes a call to a telephone terminal that is not managed by the telephone relaying apparatus 200, and a case where the call destination telephone terminal 300 receives a call from a telephone terminal that is not managed by the telephone relaying apparatus 200, the telephone relaying apparatus 200 may perform the transformation process of the published number and the real number in each case.

Figure 15:
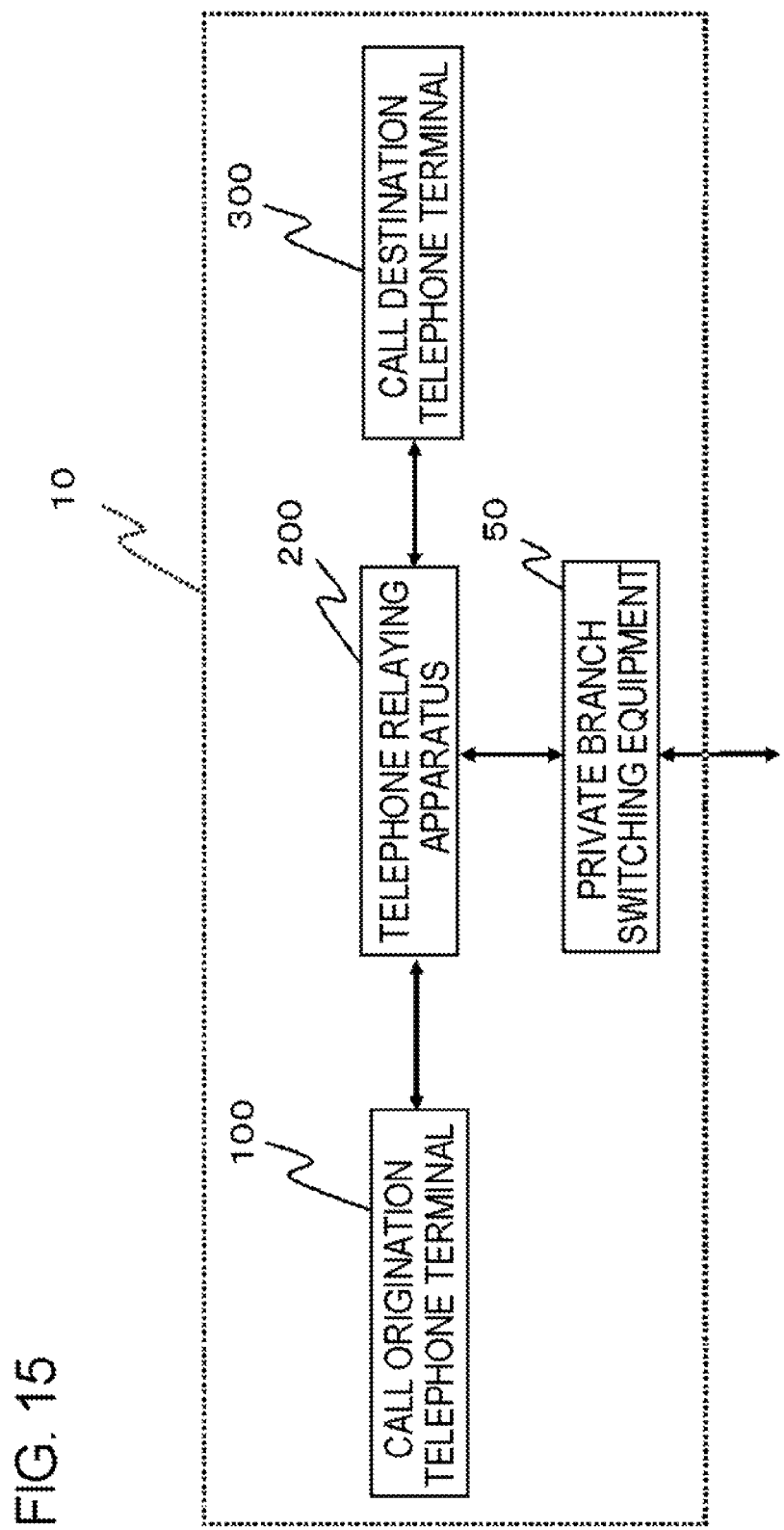
FIG. 15 is a diagram illustrating a usage environment of a telephone relaying apparatus according to a seventh embodiment.

FIG. 15 shows a diagram illustrating a usage environment of a telephone relaying apparatus 200 according to a seventh embodiment, and corresponds to FIG. 1 of the first embodiment. The telephone relaying apparatus 200 of this embodiment is the same as that of any one of the first embodiment to the sixth embodiment except that the telephone relaying apparatus 200 is connected to the call origination telephone terminal 100 and the call destination telephone terminal 300 without through the private branch switching equipment 50. FIG. 15 shows the same case as that of the first embodiment. A functional block diagram of the telephone relaying apparatus 200 according to this embodiment is the same as that of any one of the first embodiment to the sixth embodiment. In addition, in an example shown in this drawing, a gateway device may be provided at least between the call origination telephone terminal 100 and the telephone relaying apparatus 200, and between the call destination telephone terminal 300 and the telephone relaying apparatus.

Figure 16:
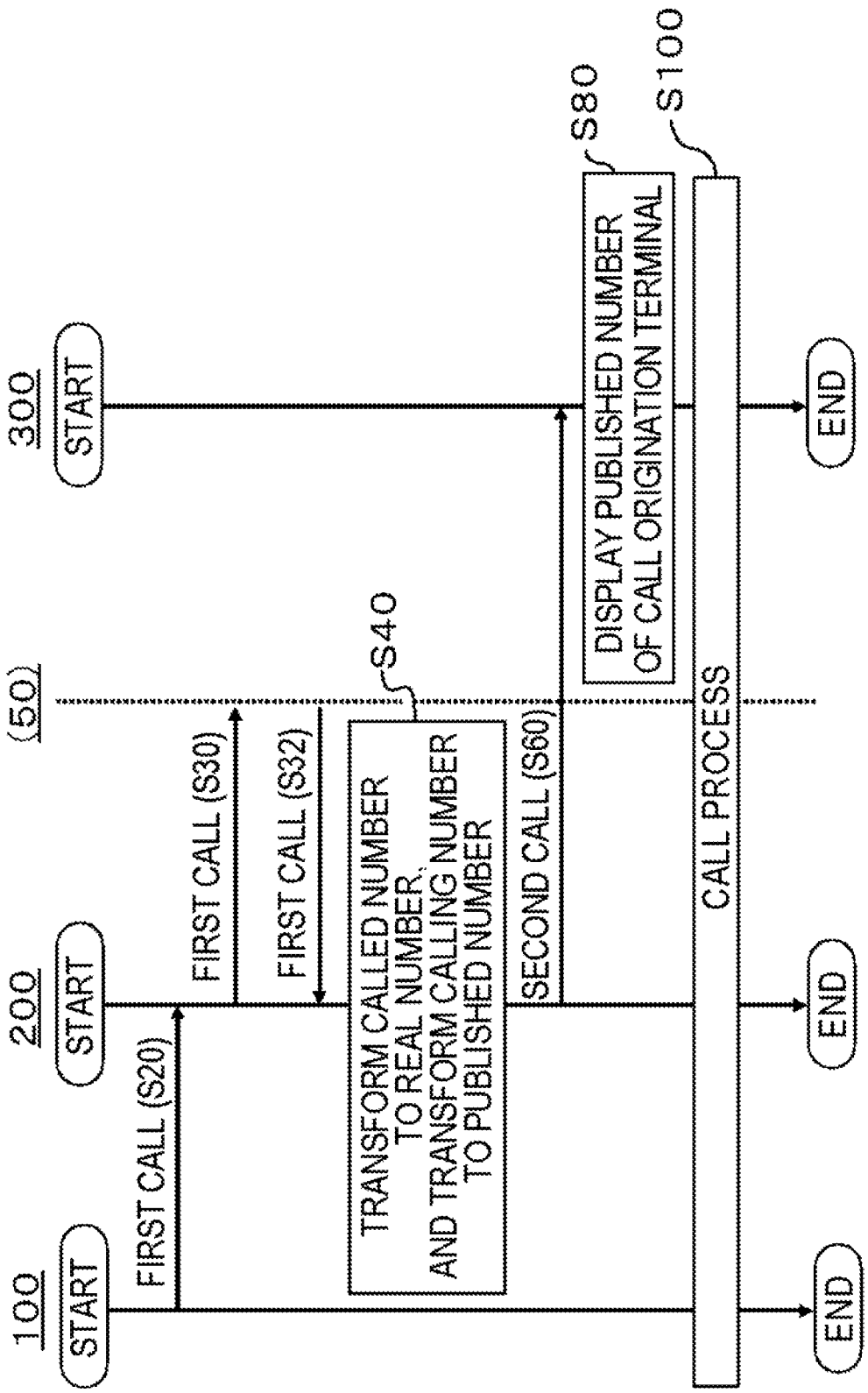
FIG. 16 is a flow chart illustrating a first example of a telephone relaying process according to the seventh embodiment.

FIG. 16 shows a flow chart illustrating a first example of a telephone relaying process according to this embodiment. When the call origination telephone terminal 100 makes a first call, the first call is transmitted to the relaying unit 220 of the telephone relaying apparatus 200 (step S20). In regard to the first call, a calling number is the real number of the call origination telephone terminal 100 and a called number is the published number of the call destination telephone terminal 300.

The relaying unit 220 of the telephone relaying apparatus 200 transmits the first call to the private branch switching equipment 50 (step S30). The private branch switching equipment 50 refers to the called number of the first call, and returns the first call to the telephone relaying apparatus 200 (step S32).

The subsequent processes (step S40 to step S100) are the same as those of any of the first to sixth embodiments. However, the relaying unit 220 and the call origination telephone terminal 100 are connected without through the private branch switching equipment 50, and the relaying unit 220 and the call destination telephone terminal 300 are connected through the private branch switching equipment 50.

Figure 17:
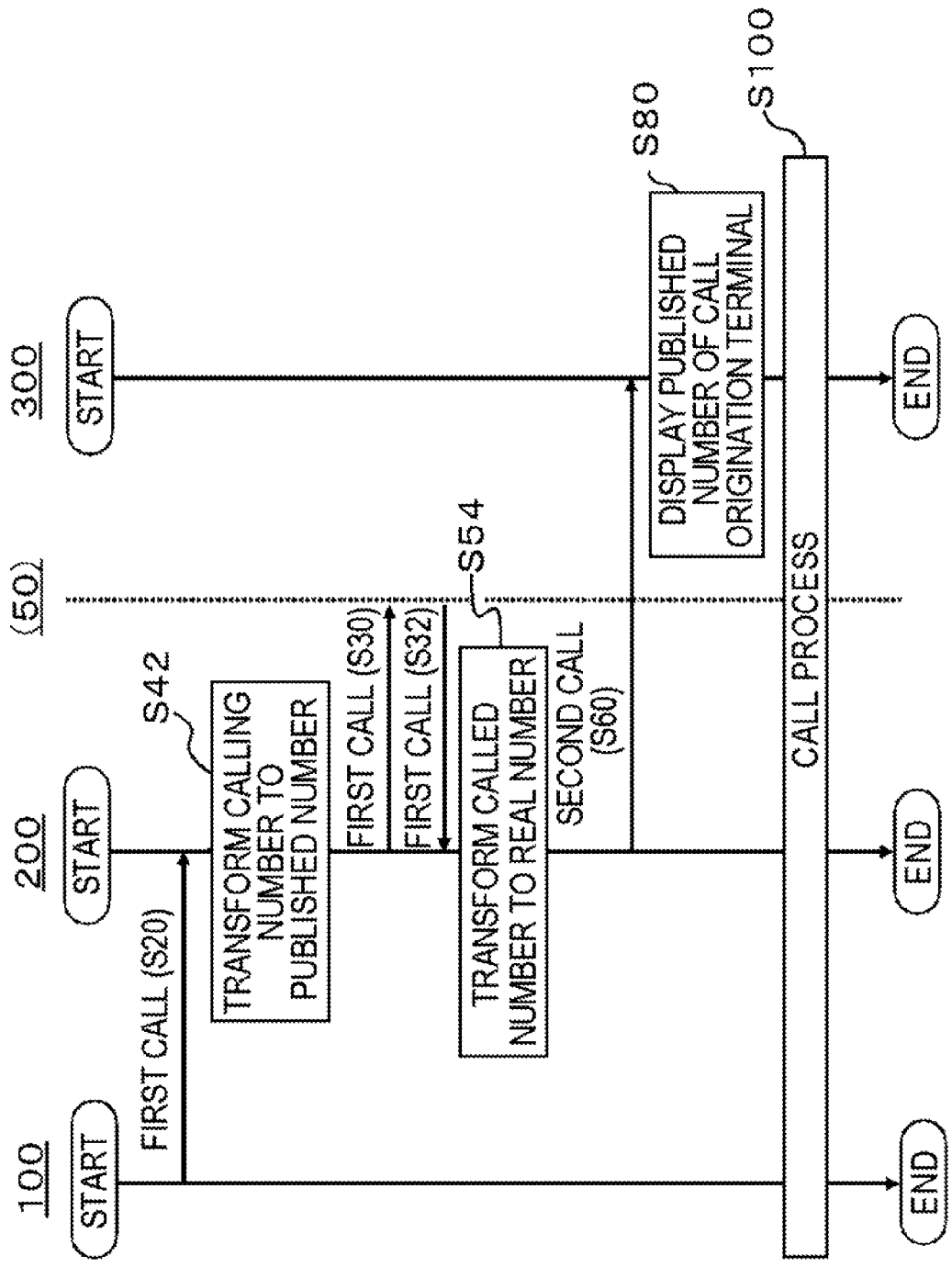
FIG. 17 is a flow chart illustrating a second example of a telephone relaying process according to the seventh embodiment.

FIG. 17 shows a flow chart illustrating a second example of a telephone relaying process according to this embodiment. In the second example, when receiving the first call from the call origination telephone terminal 100, the relaying unit 220 reads out the published number of the call origination telephone terminal 100 from the published number storage unit by using the real number, which is included in the first call, of the call origination telephone terminal 100 (step S42). The relaying unit 220 transmits the first call to the private branch switching equipment 50. In regard to the first call, the calling number is the published number of the call origination telephone terminal 100 (step S30). The private branch switching equipment 50 refers the called number of the first call and returns the first call to the telephone relaying apparatus 200 (step S32).

The relaying unit 220 of the telephone relaying apparatus 200 receives the first call that is returned by the private branch switching equipment 50. The number transforming unit 230 of the telephone relaying apparatus 200 reads out the real number of the call destination telephone terminal 300 from the published number storage unit by using the published number, which is included in the first call which the relaying unit 220 receives, of the call destination telephone terminal 300 (step S54). The subsequent processes (step S60 to step S100) are the same as those of the first example.

According to this embodiment, it is also possible to obtain the same effect as that of the first to sixth embodiments. In addition, in this embodiment, in a case where the call origination telephone terminal 100 and the call destination telephone terminal 300 are IP telephones, the telephone relaying apparatus 200 may perform transmission and reception of a voice stream between the call origination telephone terminal 100 and the call destination telephone terminal 300 without through the private branch switching equipment 50 in a call process similarly to the fourth embodiment. In addition, the call origination telephone terminal 100 and the call destination telephone terminal 300 may perform transmission and reception of a voice stream with peer-to-peer to each other.

Figure 18:
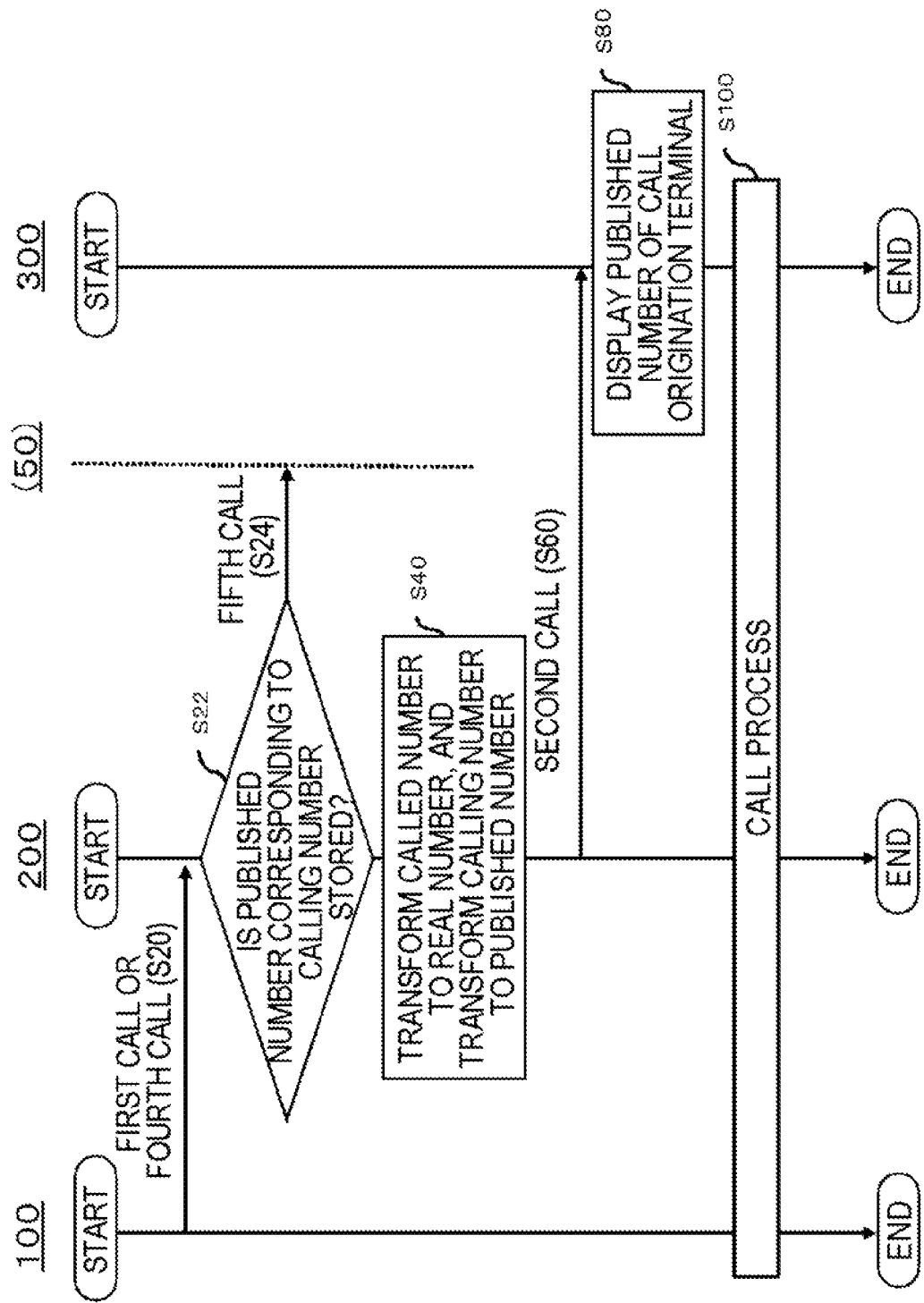
FIG. 18 is a flow chart illustrating the details of a relaying process using a telephone relaying apparatus according to an eighth embodiment.

FIG. 18 shows a flow chart illustrating the details of a relaying process using a telephone relaying apparatus 200 according to an eighth embodiment. In this embodiment, a usage environment of the telephone relaying apparatus 200 is the same as that shown in FIG. 15 in the seventh embodiment, and the telephone relaying apparatus 200 is connected to the call origination telephone terminal 100 and the call destination telephone terminal 300 without through the private branch switching equipment 50. In addition, a functional block diagram of the telephone relaying apparatus 200 according to this embodiment is the same as that of the first embodiment.

A process according to this embodiment is the same as that of the second embodiment except that the relaying unit 220 and the call origination telephone terminal 100 are connected without through the private branch switching equipment 50, and the relaying unit 220 and the call destination telephone terminal 300 are connected without through the private branch switching equipment 50. That is, in this embodiment, in a case where a calling number of a first call is stored in the published number storage unit 210 as the published number, the relaying unit 220 directly transmits a second call to the call destination telephone terminal 300 (step S60).

According to this embodiment, it is also possible to obtain the same effect as that of the second embodiment. In addition, the first call and the second call are made without through the private branch switching equipment 50, such that it is possible to make a load on the private branch switching equipment 50 small.

Figure 19:
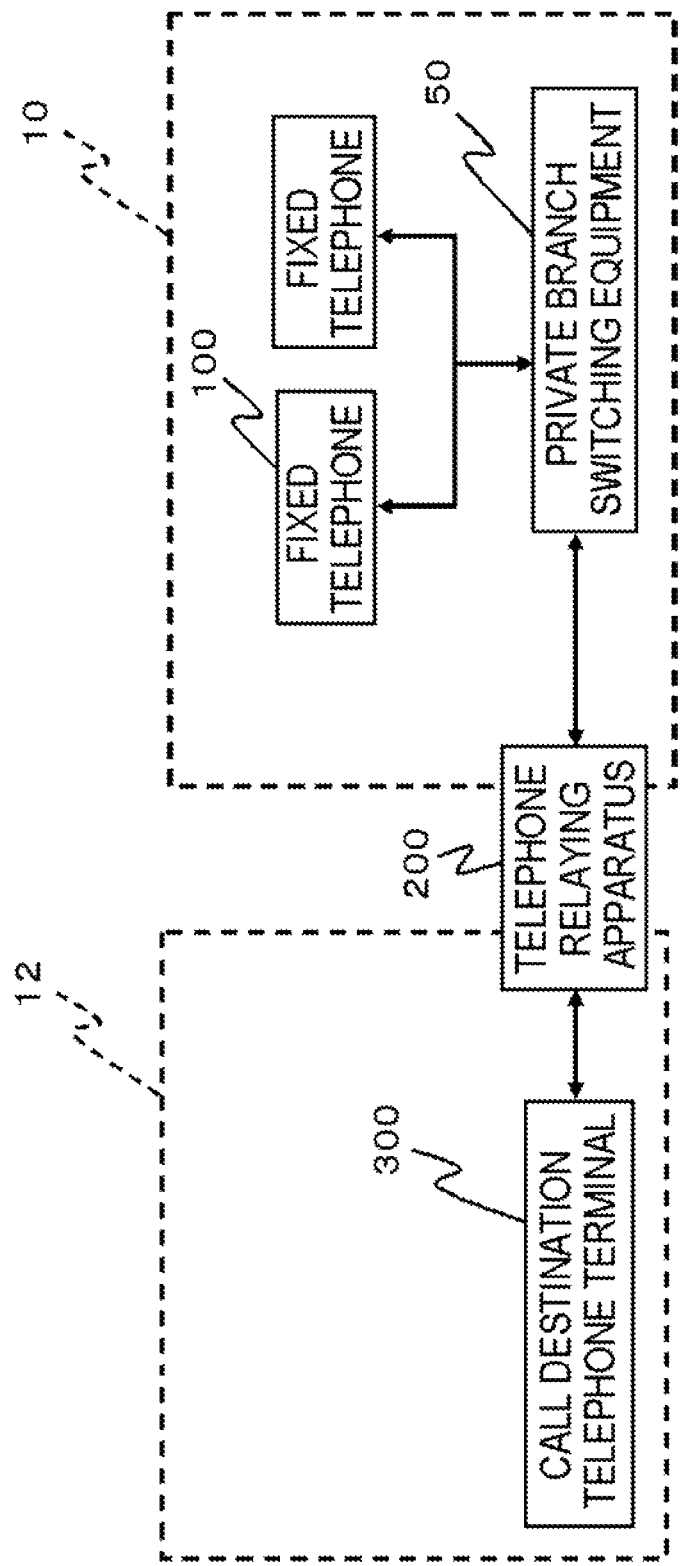
FIG. 19 is a diagram illustrating a usage environment of a telephone relaying apparatus 200 according to a ninth embodiment.

FIG. 19 shows a diagram illustrating a usage environment of a telephone relaying apparatus 200 according to a ninth embodiment, and corresponds to FIG. 1 in the first embodiment. In an example shown in the drawing, the call origination telephone terminal 100 is a fixed telephone located within the extension communication network 10, and is connected to the private branch switching equipment 50. The call destination telephone terminal 300 is located in an extension communication network 12 different from the extension communication network 10. In addition, the extension communication network 12 may also include private branch switching equipment 50. In this case, the call destination telephone terminal 300 is connected to the telephone relaying apparatus 200 through the private branch switching equipment 50.

The telephone relaying apparatus 200 is provided, for example, within the extension communication network 10. The published number storage unit 210 of the telephone relaying apparatus 200 stores the published number and the real number of the call destination telephone terminal 300.

Figure 20:
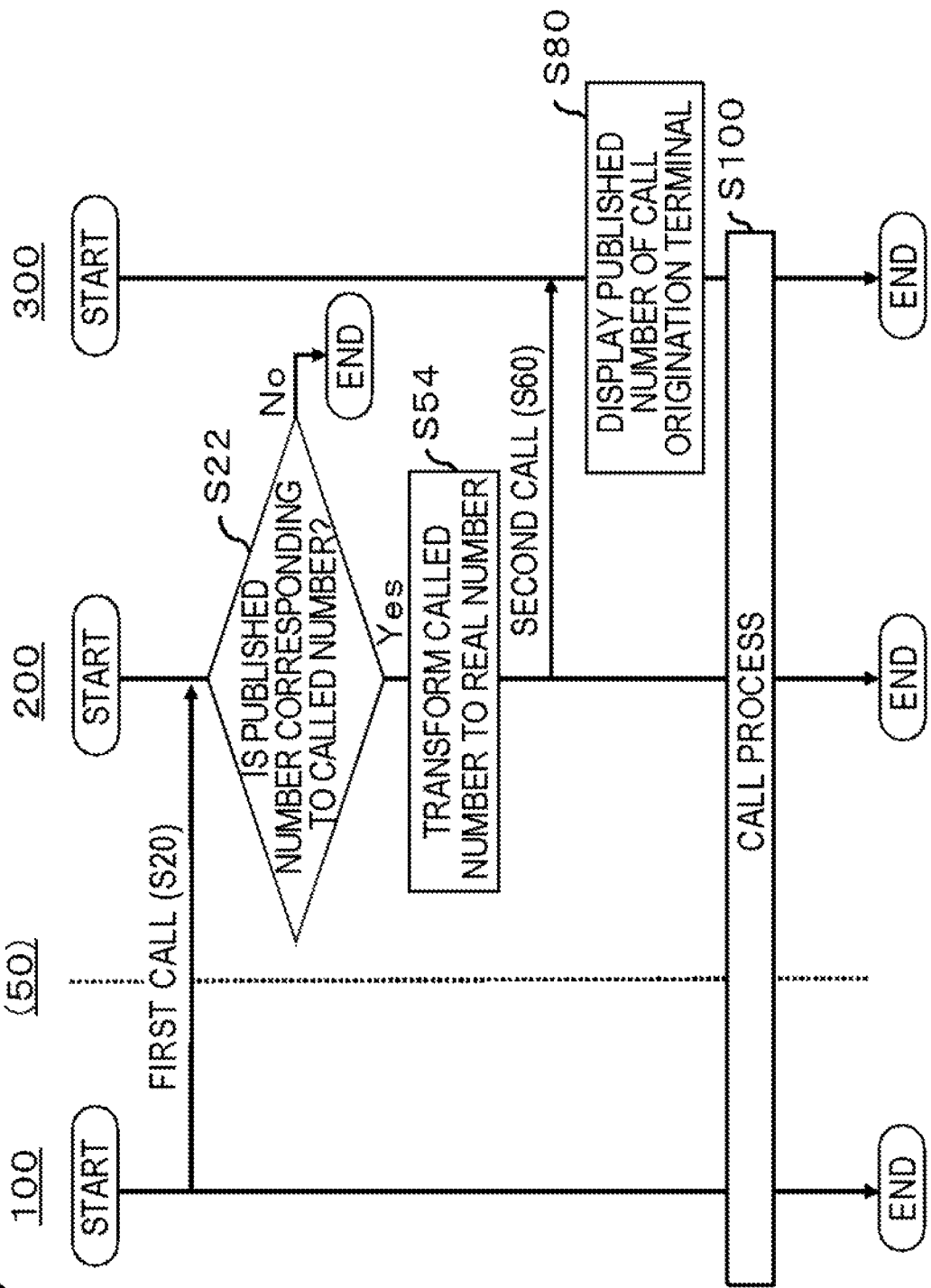
FIG. 20 is a flow chart illustrating a first example of a telephone relaying process using the telephone relaying apparatus shown in FIG. 19.

FIG. 20 shows flow chart illustrating a first example of a telephone relaying process using the telephone relaying apparatus 200 shown in FIG. 19. The call origination telephone terminal 100 transmits a first call to the relaying unit 220 of the telephone relaying apparatus 200. In regard to this first call, a calling number is a telephone number of the call origination telephone terminal 100 and is not stored in the published number storage unit 210 of the telephone relaying apparatus 200 (step S20).

When a telephone number corresponding to a called number included in the first call which the relaying unit 220 receives is stored as the published number in the published number storage unit 210 (Yes in step S22), the relaying unit 220 and the number transforming unit 230 transforms the called number that is the published number to the real number (step S54), and the subsequent processes (step S60 to step S100) are the same as those of the first embodiment.

In addition, in a case where a telephone number corresponding to the called number of the first call which the relaying unit 220 receives is not stored in the published number storage unit 210 as the published number (No in step S22), the relaying unit 220 performs an error process. As the error process, a process of broadcasting an announcement, or a disconnection process may be exemplified. In addition, the relaying unit 220 may make a call to a telephone relaying device (not shown) of the extension communication network 12 as it is without performing the error process and transforming process of the calling number.

Figure 21:
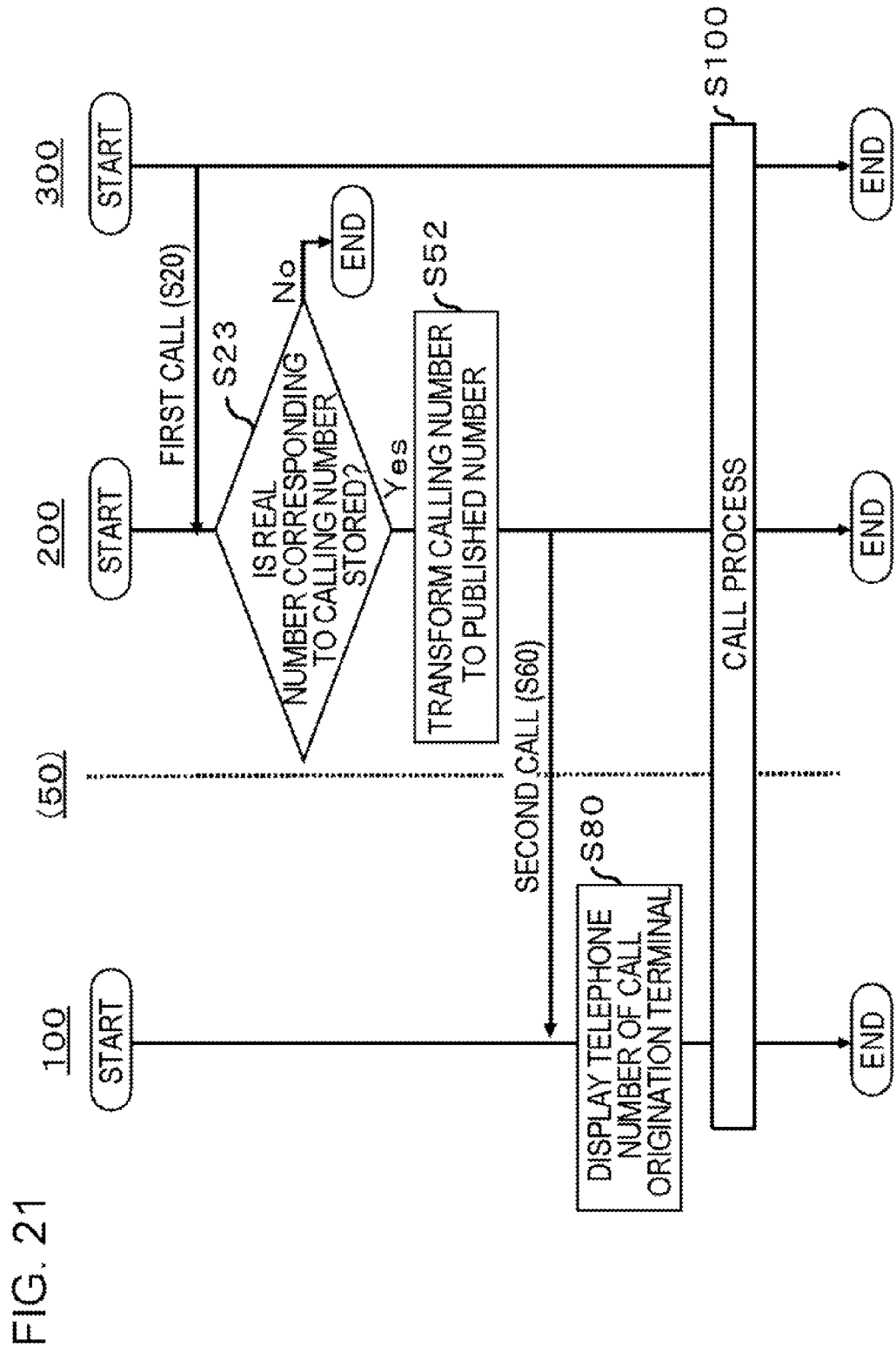
FIG. 21 is a flow chart illustrating a second example of a telephone relaying process using a telephone relaying apparatus shown in FIG. 19.

FIG. 21 shows a flow chart illustrating a second example of a telephone relaying process using the telephone relaying apparatus 200 shown in FIG. 19. In contrast to the example shown in FIG. 20, a case where a call is made from the call destination telephone terminal 300 to the call origination telephone terminal 100 is illustrated in an example shown in this drawing. The call destination telephone terminal 300 transmits the first call to the relaying unit 220 of the telephone relaying apparatus 200. In regard to this first call, a called number is a telephone number of the call origination telephone terminal 100, and is not stored in the published number storage unit 210 of the telephone relaying apparatus 200 (step S20).

When a telephone number corresponding to a calling number included in the first call which the relaying unit 220 receives is stored as the published number in the published number storage unit 210 (Yes in step S23), the relaying unit 220 and the number transforming unit 230 transforms the calling number that is the real number to the published number (step S52). The subsequent processes (step S60 to step S100) are the same as those of the first embodiment.

In addition, in a case where a telephone number corresponding to the called number of the first call which the relaying unit 220 receives is not stored in the published number storage unit 210 as the published number (No in step S23), the relaying unit 220 performs an error process. In addition, the relaying unit 220 may make a call to a telephone relaying apparatus (not shown) of the extension communication network 12 as it is without performing the error process and the transforming process of the calling number.

Figure 22:
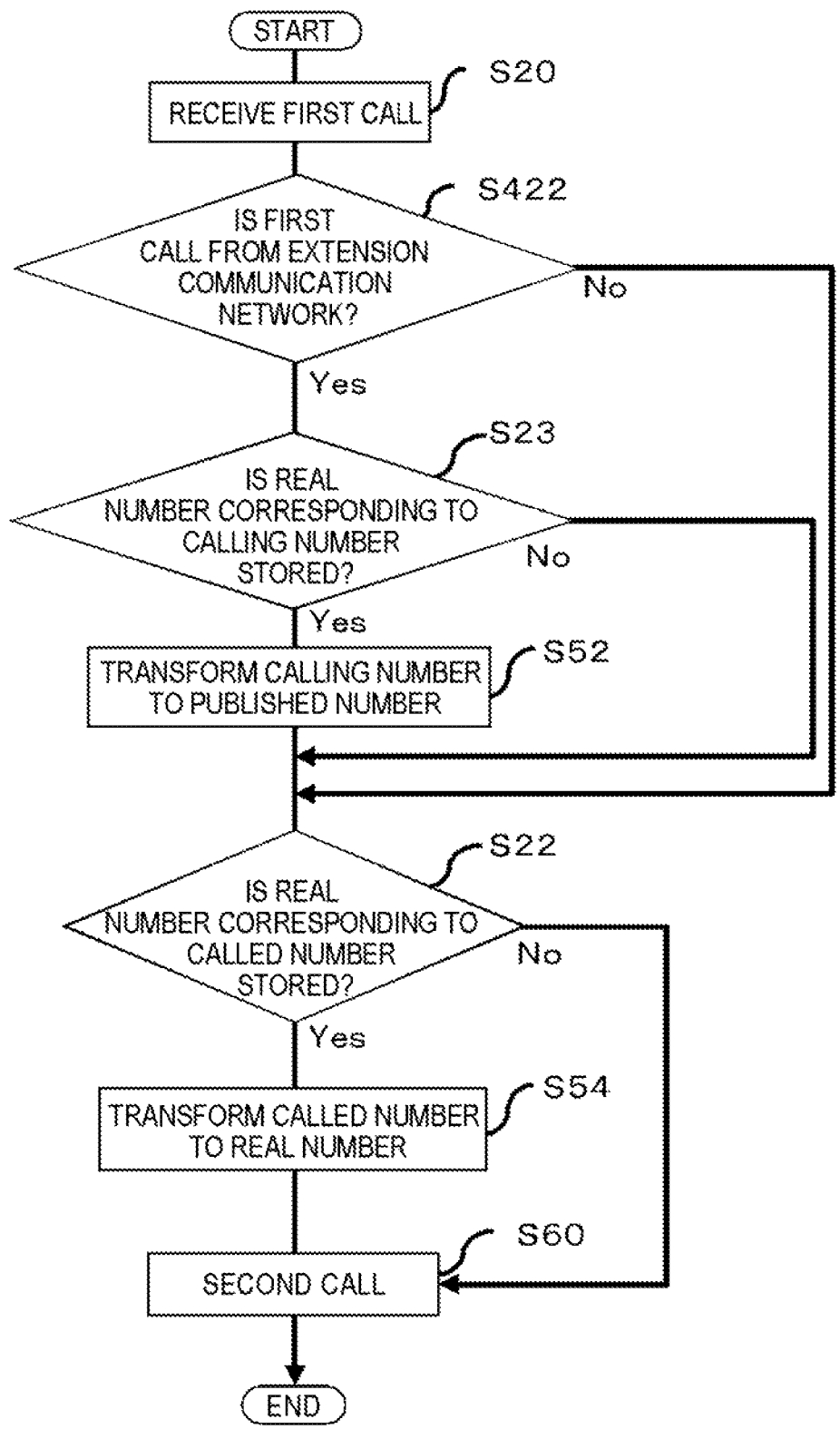
FIG. 22 is a flow chart illustrating a third example of a telephone relaying process using a telephone relaying apparatus shown in FIG. 19.

FIG. 22 shows a flow chart illustrating a third example of a telephone relaying process using the telephone relaying apparatus 200. In this drawing, only a process of the telephone relaying apparatus 200 is shown. When receiving a first call (step S20), the telephone relaying apparatus 200 confirms a calling number included in the first call, and thereby confirms that the first call is transmitted from either the extension communication network 10 or 12 (step S422). When the first call is transmitted from the extension communication network 12 (Yes in step S422), the telephone relaying apparatus 200 performs processes shown in steps S23 and S52 of FIG. 21, and then performs processes shown in steps S22 and S54 of FIG. 20. When the first call is transmitted from the extension communication network 10 (No in step S422), the telephone relaying apparatus 200 performs the processes shown in steps S22 and S54 of FIG. 20 without performing the processes shown in steps S23 and S52 of FIG. 21. Although not shown in this drawing, the subsequent processes are the same as steps S60 to S100 of FIGS. 20 and 21.

According to this embodiment, it is possible to show as if the call destination telephone terminal 300 belonging to the extension communication network 12 was located within the extension communication network 10.

Figure 23:
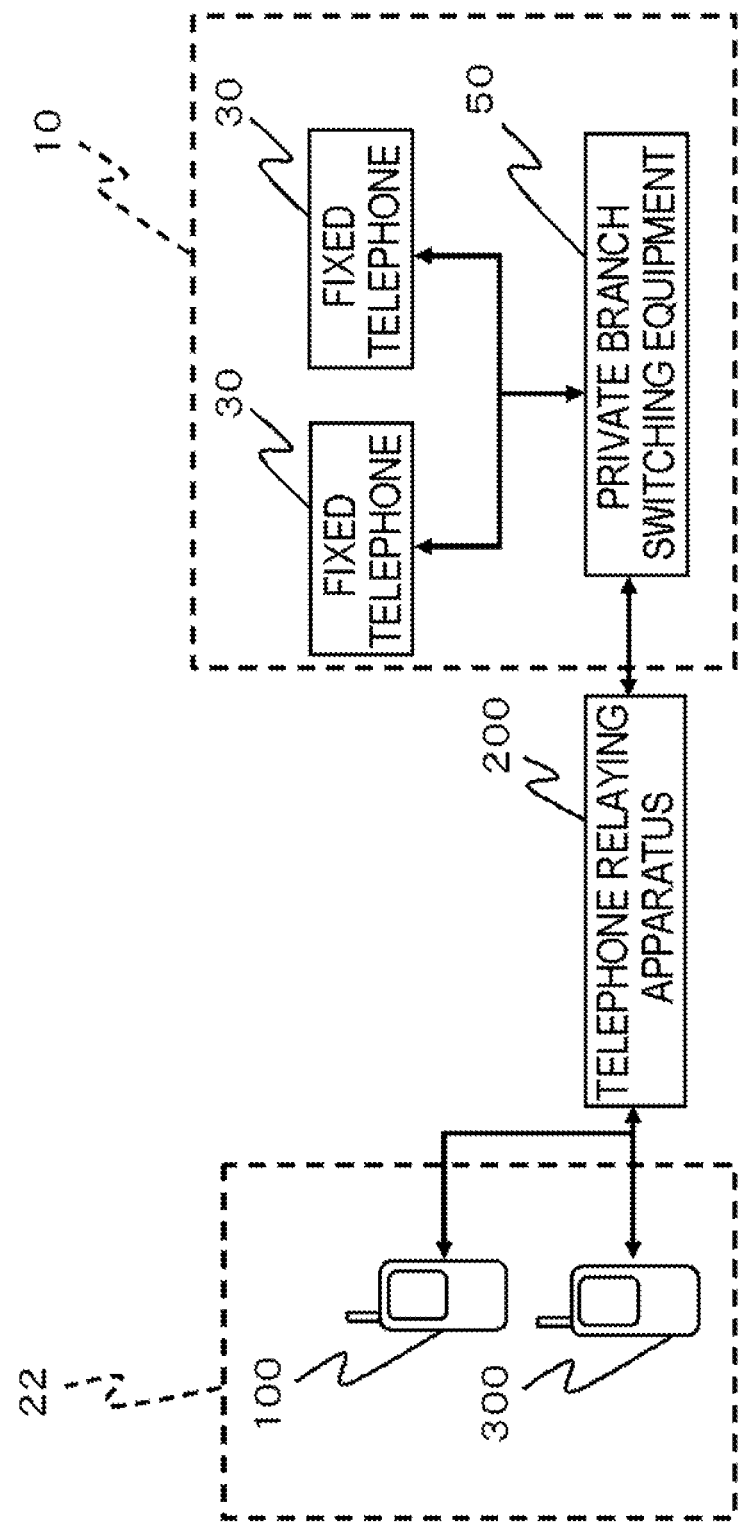
FIG. 23 is a diagram illustrating a usage environment of a telephone relaying apparatus according to a tenth embodiment.

FIG. 23 shows a diagram illustrating a usage environment of a telephone relaying apparatus 200 according to a tenth embodiment, and corresponds to FIG. 1 of the first embodiment. In this embodiment, the telephone relaying apparatus 200 connects the extension wireless communication network 10 and a wireless communication network 22 with each other. Specifically, the telephone relaying apparatus 200 is connected to the private branch switching equipment 50 in the extension communication network 10. The extension communication network 10 includes a plurality of fixed telephones 30. In addition, the call origination telephone terminal 100 and the call destination telephone terminal 300 are wireless communication terminals that are connected to the wireless communication network 22.

The published number storage unit 210 of the telephone relaying apparatus 200 stores a published number and a real number of the communication terminals that are connected to the wireless communication network 22 in correlation with each other. The real number is a number including a numerical string indicating that the telephone terminal is a wireless communication terminal, and the published number is a number including a numerical string indicating that the telephone terminal is located within the extension communication network 10.

In this embodiment, a relaying process of telephone from the call origination telephone terminal 100 to the call destination telephone terminal 300 is the same as that of the first embodiment except for timing passing through private branch switching equipment 50. In addition, a relaying process of a telephone from the fixed telephone 30 to the call origination telephone terminal 100 or the call destination telephone terminal 300, and a relaying process of a telephone from the call origination telephone terminal 100 or the call destination telephone terminal 300 to the fixed telephone 30 are the same as that of the ninth embodiment.

According to this embodiment, when a mobile communication terminal is used as an extension telephone, it is possible to show as if the mobile telephone terminal was located within the extension communication network 10.

Figure 24:
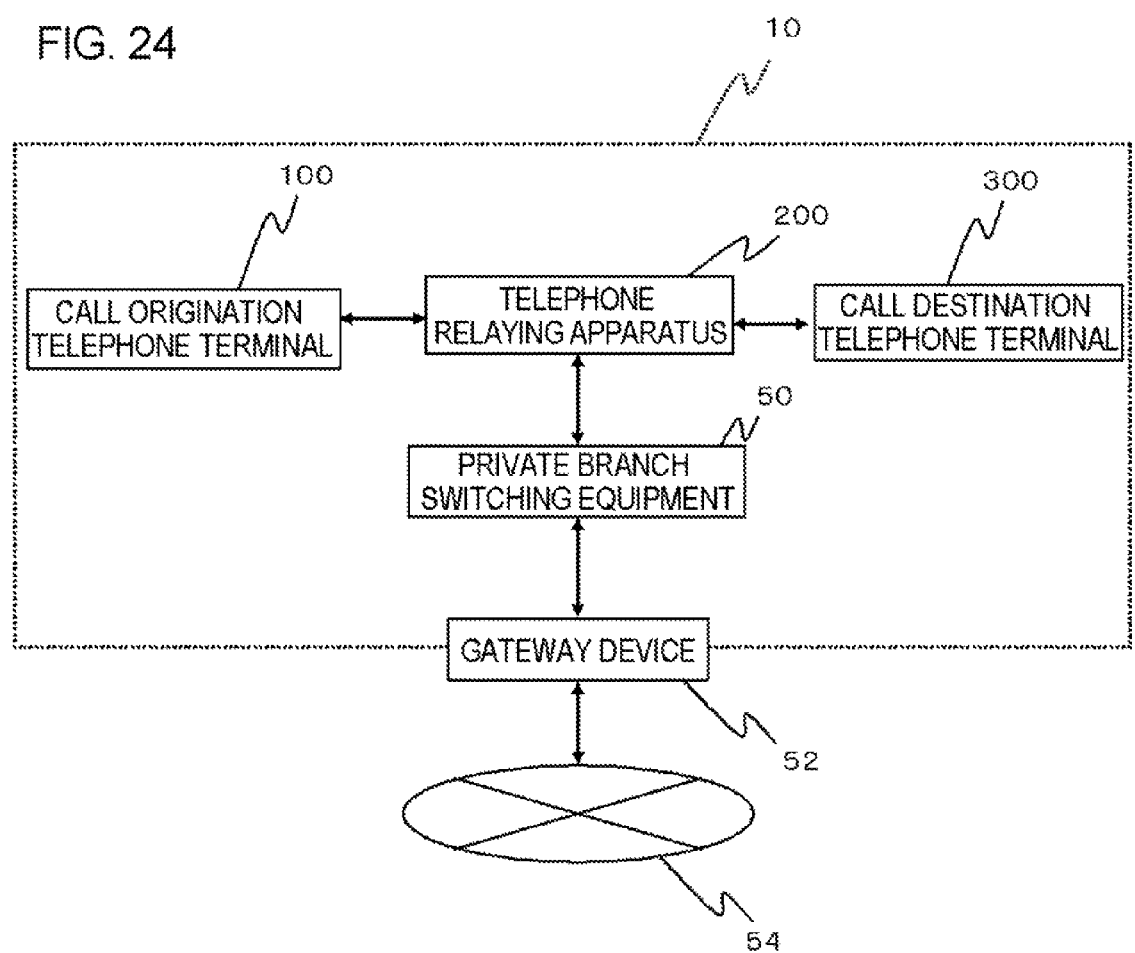
FIG. 24 is a diagram illustrating a usage environment of a telephone relaying apparatus according to an eleventh embodiment.

FIG. 24 shows a diagram illustrating a usage environment of a telephone relaying apparatus 200 according to an eleventh embodiment, and corresponds to FIG. 15 of the seventh embodiment. This embodiment is the same as the seventh embodiment except that the private branch switching equipment 50 is connected to a public communication network 54 through a gateway device 52. A functional block diagram of the telephone relaying apparatus 200 is the same as that shown in FIG. 2 of the first embodiment. In this embodiment, an external number is also allocated to the call origination telephone terminal 100 and the call destination telephone terminal 300.

FIG. 25 shows a diagram illustrating data that a published number storage unit 210 of a telephone relaying apparatus 200 stores in a table format. In this drawing, the published number storage unit 210 stores the published number, the external number as a first real number, and the extension number as a second real number in correlation with each other for each telephone terminal.

Figure 26:
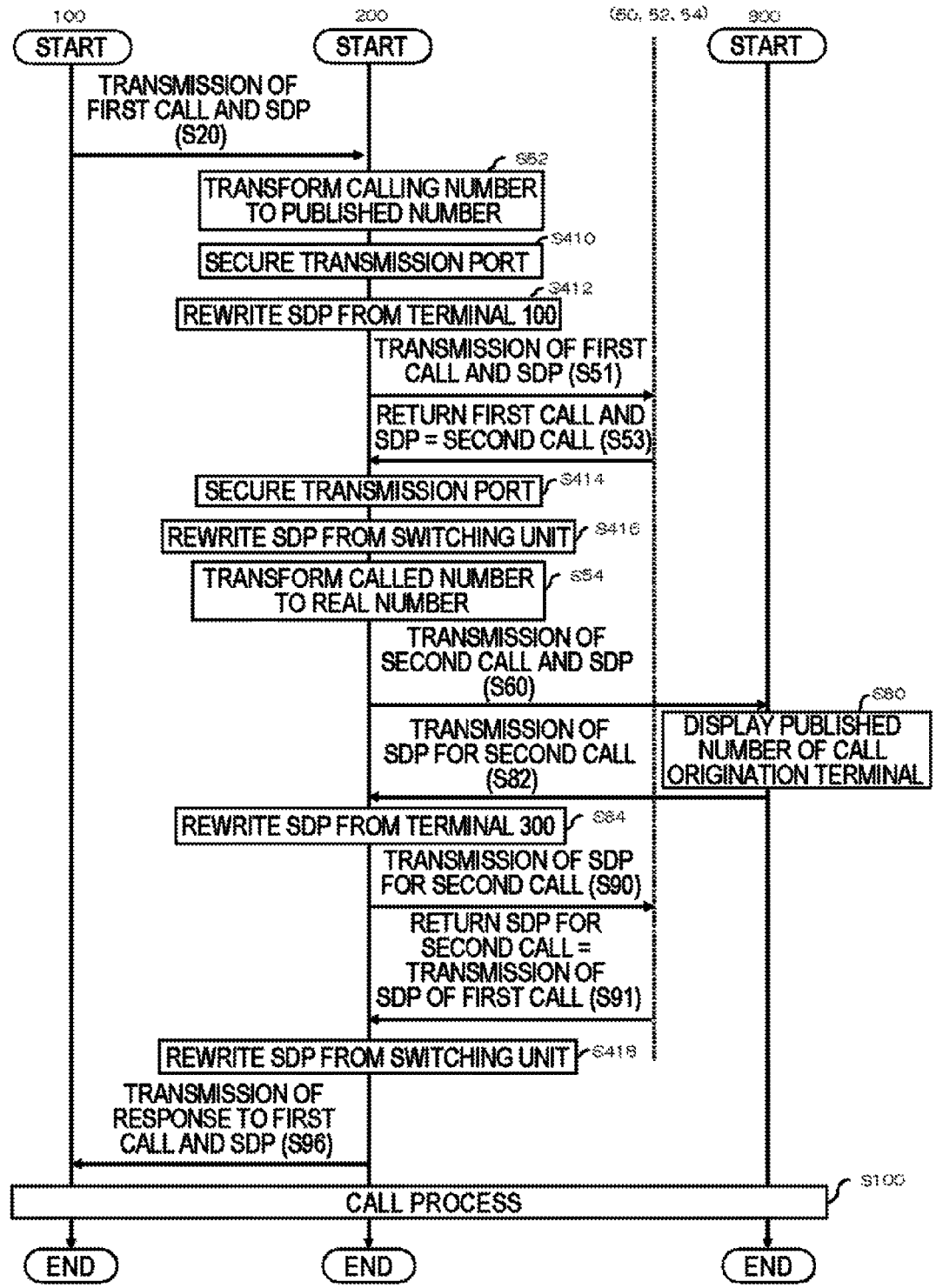
FIG. 26 is a flow chart illustrating a first example of a telephone relaying process using a telephone relaying apparatus shown in FIG. 24.

FIG. 26 shows a flow chart illustrating a first example of a telephone relaying process using the telephone relaying apparatus 200 shown in FIG. 24. In an example shown in this drawing, the call origination telephone terminal 100 and the call destination telephone terminal 300 are IP telephones. First, the call origination telephone terminal 100 transmits the first call and a SDP to the telephone relaying apparatus 200 (step S20). In regard to the first call, a calling number is an extension number of the call origination telephone terminal 100, and a called number is an external number of the call destination telephone terminal 300. That is, in a process shown in FIG. 26, the external number corresponds to the published number, and the extension number corresponds to the real number.

The number transforming unit 230 of the telephone relaying apparatus 200 transforms the extension number of the call origination telephone terminal 100, which is the calling number of the first call, to the published number of the call origination telephone terminal 100 (step S52). The packet transmitting unit 224 of the relaying unit 220 secures a port for a voice packet transmission from empty ports (step S410), and rewrites the SDP that is received from the call origination telephone terminal 100 such that the voice packet is transmitted through the transmission port secured in step S410 (step S412). The packet transmitting unit 224 transmits the first call received from the packet transmitting unit 224 and the SDP rewritten in step S412 to the public communication network 54 through the private branch switching equipment 50 and the gateway device 52 (step S51).

The public communication network 54 returns the first call and the SDP transmitted from the packet transmitting unit 224 to the packet transmitting unit 224 through the gateway device 52 and the private branch switching equipment 50 as a second call (step S53). The packet transmitting unit 224 secures a port for a voice packet transmission from empty ports (step S414), and rewrites the SDP received from the private branch switching equipment 50 such that the voice packet is transmitted through the transmission port secured in step S414 (step S416).

The number transforming unit 230 of the relaying unit 220 reads out the extension number of the call destination telephone terminal 300 from the published number storage unit 210 based on the external number, which is included in the first call, of the call destination telephone terminal 300, and transforms the called number to the extension number (that is, real number) (step S54). The packet transmitting unit 224 transmits the second call and the rewritten SDP to the call destination telephone terminal 300 through the gateway device 52 and the public communication network (step S60). In regard to the second call, a calling number is the extension number of the call origination telephone terminal 100 and the called number is the external number of the call destination telephone terminal 300.

When receiving a second call, the call destination telephone terminal 300 displays the external number of the call origination telephone terminal 100 (step S80). When a user makes an input indicating a response to the second call, the call destination telephone terminal 300 transmits the SDP for the second call with respect to the relaying unit 220 of the telephone relaying apparatus 200 through the public communication network 54, the gateway device 52, and the private branch switching equipment 50 (step S82). The packet transmitting unit 224 of the relaying unit 220 secures a port for a voice packet transmission from empty ports, and rewrites the SDP that is received from the call destination telephone terminal 300 such that the voice packet is transmitted through the secured transmission port (step S84). The packet transmitting unit 224 transmits the rewritten SDP to the public communication network 54 through the private branch switching equipment 50 and the gateway device 52 (step S90).

The public communication network 54 returns the SDP transmitted from the packet transmitting unit 224 to the packet transmitting unit 224 as the SDP with respect to the first call through the gateway device 52 and the private branch switching equipment 50 (step S91). The packet transmitting unit 224 of the relaying unit 220 secures a port for a voice packet transmission in empty ports, and rewrites the SDP that is received from the private branch switching equipment 50 such that the voice packet is transmitted through the secured transmission port (step S418). The packet transmitting unit 224 transmits the rewritten SDP to the call origination telephone terminal 100 together with a response to the first call (step S96).

The packet transmitting unit 224 of the telephone relaying apparatus 200, the call origination telephone terminal 100, and the call destination telephone terminal 300 performs a process for a call (step S100). In regard to this process, the call origination telephone terminal 100 and the call destination telephone terminal 300 receives the SDP of a counterpart. A port number of the packet transmitting unit 224 is included in each received SDP. After a communication between the call origination telephone terminal 100 and the call destination telephone terminal 300 is established, the packet transmitting unit 224 allows the voice data to be relayed between the call origination telephone terminal 100 and the call destination telephone terminal 300 by using the port number, which is included in the SDP, of the packet transmitting unit 224 without through the private branch switching equipment 50.

In addition, when capable of recognizing mutual IP addresses by the SDP, the call origination telephone terminal 100 and the call destination telephone terminal 300 may perform transmission and reception of the voice stream with peer-to-peer.

The SDP which the telephone relaying apparatus 200 receives in S53 includes an IP address of the telephone relaying apparatus 200, such that is possible to omit the processes in step S414, step S416, and step S418.

Figure 27:
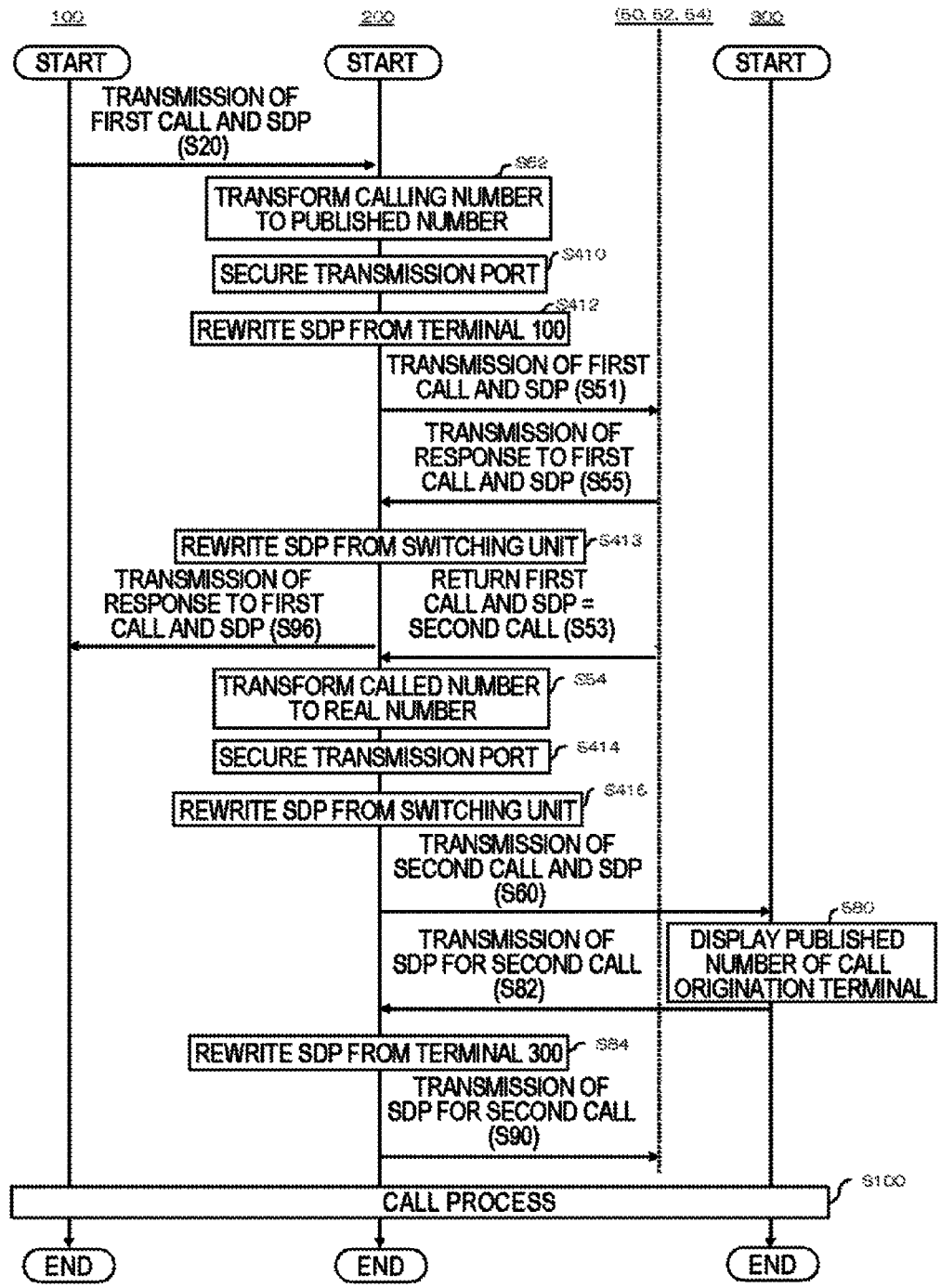
FIG. 27 is a flow chart illustrating a second example of a telephone relaying process using a telephone relaying apparatus shown in FIG. 24.

FIG. 27 shows a flow chart illustrating a second example of a telephone relaying process using the telephone relaying apparatus 200 shown in FIG. 24. In an example shown in this drawing, the call origination telephone terminal 100 and the call destination telephone terminal 300 are IP telephones. First, the call origination telephone terminal 100 transmits a first call and an SDP to the telephone relaying apparatus 200 (step S20). In regard to the first call, a calling number is an extension number of the call origination telephone terminal 100, and a called number is an external number of the call destination telephone terminal 300. That is, in a process shown in FIG. 26, the external number corresponds to the published number, and the extension number corresponds to the real number.

The number transforming unit 230 of the telephone relaying apparatus 200 transforms the extension number of the call origination telephone terminal 100, which is the calling number of the first call, to the published number of the call origination telephone terminal 100 (step S52). The packet transmitting unit 224 of the relaying unit 220 secures a port for a voice packet transmission in empty ports (step S410), and rewrites the SDP that is received from the call origination telephone terminal 100 such that the voice packet is transmitted through the transmission port secured in step S410 (step S412). The packet transmitting unit 224 transmits the first call received from the packet transmitting unit 224 and the SDP rewritten in step S412 to the public communication network 54 through the private branch switching equipment 50 and the gateway device 52 (step S51).

At this time, the private branch switching equipment 50 returns the first call and the SDP transmitted from the packet transmitting unit 224 to the packet transmitting unit 224 (step S55). At this time, the private branch switching equipment 50 rewrites the SDP received from the packet transmitting unit 224 and transmits the rewritten SDP to the packet transmitting unit 224. The packet transmitting unit 224 rewrites the SDP received from the private branch switching equipment 50 (step S413), and transmits the rewritten SDP to the call origination telephone terminal 100 together with a response to the first call (step S96).

In addition, the public communication network 54 returns the first call and the SDP transmitted from the packet transmitting unit 224 through the private branch switching equipment 50 and the gateway device 52 to the packet transmitting unit 224 as a second call through the gateway device 52 and the private branch switching equipment 50 (step S53).

In addition, the number transforming unit 230 of the relaying unit 220 reads out the extension number of the call destination telephone terminal 300 from the published number storage unit 210 based on the external number, which is included in the first call, of the call destination telephone terminal 300, and transforms the called number to the extension number (that is, the real number) (step S54). In addition, the packet transmitting unit 224 secures a port for a voice packet transmission in empty ports (step S414), and rewrites the SDP that is received from the private branch switching equipment 50 such that the voice packet is transmitted through the transmission port secured in step S414 (step S416). In addition, the packet transmitting unit 224 transmits the second call and the rewritten SDP to the call destination telephone terminal 300 through the private branch switching equipment 50, the gateway device 52, and the public communication network (step S60). In regard to the second call, a calling number is the extension number of the call origination telephone terminal 100 and the called number is the external number of the call destination telephone terminal 300.

When receiving a second call, the call destination telephone terminal 300 displays the external number of the call origination telephone terminal 100 (step S80). When a user makes an input indicating a response to the second call, the call destination telephone terminal 300 transmits the SDP for the second call with respect to the relaying unit 220 of the telephone relaying apparatus 200 through the public communication network 54, the gateway device 52, and the private branch switching equipment 50 (step S82). The packet transmitting unit 224 of the relaying unit 220 rewrites the SDP that is received from the call destination telephone terminal 300 (step S84). The packet transmitting unit 224 transmits the rewritten SDP to the public communication network 54 through the private branch switching equipment 50 and the gateway device 52 (step S90).

The packet transmitting unit 224 of the telephone relaying apparatus 200, the call origination telephone terminal 100, and the call destination telephone terminal 300 performs a process for a call (step S100). In regard to this process, the call origination telephone terminal 100 and the call destination telephone terminal 300 receives the SDP of a counterpart. A port number of the packet transmitting unit 224 is included in each received SDP. After a communication between the call origination telephone terminal 100 and the call destination telephone terminal 300 is established, the packet transmitting unit 224 allows the voice data to be relayed between the call origination telephone terminal 100 and the call destination telephone terminal 300 by using the port number, which is included in the SDP, of the packet transmitting unit 224 without through the private branch switching equipment 50.

FIG. 28 shows a flow chart illustrating a third example of a telephone relaying process using the telephone relaying apparatus 200 shown in FIG. 24. An example shown in this drawing is the processes that the process shown in step S51 to step S416 and in step S90 to step S418 are omitted from FIG. 26. This relaying process is performed by confirming whether a called number of a first call is stored in the published number storage unit 210 as an external number by the number transforming unit 230. The processes shown in step S60 and step S82 are performed without through the gateway device 52 and the public communication network 54.

In addition, in the processes shown in FIG. 26 to FIG. 28, order of a partial process may be changed.

According to this embodiment, even when the call origination telephone terminal 100 uses the external number of the call destination telephone terminal 300 as the calling number, a voice stream is not transmitted through the public communication network 54 after the call is established. Therefore, it is possible to reduce traffic of the public communication network. Particularly, in the third example shown in FIG. 28, no packets are transmitted through the gateway device 52 and the public communication network 54, such that it is possible to particularly reduce the traffic of the public communication network.

Hereinbefore, the embodiments of the invention are described with reference to the accompanying drawings, but the invention is not limited to these embodiments, and various configurations may be adopted.

The present patent application claims priority from Japanese Patent Application No. 2009-116962 filed on May 13, 2009, the disclosure of which is incorporated herein by reference.

The invention claimed is:

1. A telephone relaying apparatus, comprising:
a published number storage unit that stores, for each of a plurality of telephone terminals, a real number and a published number in correlation with each other, wherein the real number represents a telephone number used for directly connecting to the telephone terminal and the published number represents a number published for a third party as a telephone number of the telephone terminal;
a first reception unit that receives a first call from a first telephone terminal of the plurality of telephone terminals in which a calling number is the real number of the first telephone terminal and a called number is a telephone number of a second telephone terminal of the plurality of telephone terminals;
a number transforming unit that determines, in response to the first call, the published number corresponding to the real number of the first telephone terminal from the published number storage unit; and
a relaying unit that performs a second call to the second telephone terminal in which a calling number is the determined published number of the first telephone terminal, and performs a relaying process between the first telephone terminal and the second telephone terminal.

2. The telephone relaying apparatus according to claim 1, wherein when the called number of the first call is the published number of the second telephone terminal:
the number transforming unit determines the real number corresponding to the called number of the first call from the published number storage unit, and
the relaying unit sets the real number of the second telephone terminal as the called number to of the second call.

3. The telephone relaying apparatus according to claim 1, wherein each of the plurality of telephone terminals is a wireless communication terminal and can be connected to an extension communication network, and
for each of the plurality of telephone terminals, a number including a numerical string is allocated as the real number indicating that each of the plurality of telephone terminals is a wireless communication terminal, and a number including a numerical string is allocated as the published number indicating that each of the plurality of telephone terminals is located within the extension communication network.

4. The telephone relaying apparatus according to claim 1, wherein the plurality of telephone terminals forms the extension communication network,
the published number storage unit stores an external number as the published number, and an extension number as the real number, and
the relaying unit performs a relaying process between the first telephone terminal and the second telephone terminal by using the extension number without passing through a public communication network.

5. The telephone relaying apparatus according to claim 1, wherein the first reception unit receives the first call through switching equipment that performs a connection process of the telephone terminal, and
the relaying unit makes a second call with respect to the switching equipment, and performs a relaying process between the first telephone terminal and the second telephone terminal through the switching equipment.

6. The telephone relaying apparatus according to claim 5, wherein when the called number of the first call is the published number of the second telephone terminal,
the number transforming unit reads out the published number of the first telephone terminal from the published number storage unit, based on the first call which the first reception unit receives,
the first reception unit performs, with respect to the switching equipment, a third call in which the published number of the second telephone terminal is a called number, and the real number of the first telephone terminal is a calling number, and receives the third call that is returned from the switching equipment, and
the number transforming unit reads out the real number of the second telephone terminal from the published number storage unit, based on the third call which the first reception unit receives.

7. A telephone relaying apparatus, comprising:
a published number storage unit that stores, for each of a plurality of telephone terminals, a real number and a published number in correlation with each other, wherein the real number represents a telephone number used for directly connecting to the telephone terminal and the published number represents a number published for a third party as a telephone number of the telephone terminal;
a first reception unit that receives a first call from a first telephone terminal of the plurality of telephone terminals in which a calling number is the real number of the first telephone terminal and a called number is a telephone number of a second telephone terminal of the plurality of telephone terminals;
a number transforming unit that determines, in response to the first call, the published number corresponding to the real number of the first telephone terminal from the published number storage unit; and
a relaying unit that performs a second call to the second telephone terminal in which a calling number is the determined published number of the first telephone terminal, and performs a relaying process between the first telephone terminal and the second telephone terminal,
wherein:
the first reception unit directly receives the first call from the first telephone terminal,
when the first reception unit receives the first call, the relaying unit transmits the first call to switching equipment that performs a connection process of the first telephone terminal,
the first reception unit receives the first call that is returned from the switching equipment, and
the relaying unit performs the second call through the switching equipment.

8. The telephone relaying apparatus according to claim 7, wherein before the relaying unit transmits the first call, the number transforming unit reads out the published number corresponding to the real number of the first telephone number from the published number storage unit, and
when transmitting the first call to the switching equipment, a third relaying unit uses the published number of the first telephone number as a calling number.

9. The telephone relaying apparatus according to claim 5, wherein after a communication between the first telephone terminal and the second telephone terminal is established, the relaying unit performs a relaying process between the first telephone terminal and the second telephone terminal without through the switching equipment.

10. The telephone relaying apparatus according to claim 1, wherein the plurality of telephone terminals is an IP terminal, and
the relaying unit transmits a Session Description Protocol (SDP) transmitted from the first telephone terminal to the second telephone terminal as it is, and transmits the SDP transmitted from the second telephone terminal to the first telephone terminal as it is.

11. The telephone relaying apparatus according to claim 1, wherein when the first reception unit receives a fourth call in which the real number of the first telephone terminal is set as a calling number, and a non-managed telephone number, which is a telephone number that is not stored in the published number storage unit, is set as a called number,
the number transforming unit reads out the published number corresponding to the real number of the first telephone terminal from the published number storage unit, and
the relaying unit makes a fifth call in which the non-managed telephone number is a called number, and the published number of the first telephone terminal is a calling number to switching equipment that performs a connection process of the telephone terminal.

12. A telephone relaying method, comprising:
storing in a published number storage unit, for each of a plurality of telephone terminals, a real number and a published number in correlation with each other, wherein the real number represents a telephone number used in the case of directly connecting to the telephone terminal and the published number represents a number published for a third party as a telephone number of the telephone terminal;
receiving a first call from a first telephone terminal of the plurality of telephone terminals in which a calling number is the real number of the first telephone terminal and a called number is a telephone number of a second telephone terminal of the plurality of telephone terminals;
determining, in response to the first call, the published number corresponding to the real number of the first telephone terminal from the published number storage unit;
performing a second call to the second telephone terminal in which a calling number is the determined published number of the first telephone terminal; and
performing a relaying process between the first telephone terminal and the second telephone terminal.

13. A non-transitory computer-readable storage medium that stores a program that allows a computer to operate as a telephone relaying apparatus and execute a method of relaying telephone calls, the method comprising:
storing in a published number storage unit, for each of a plurality of telephone terminals, a real number and a published number in correlation with each other, wherein the real number represents a telephone number used in the case of directly connecting to the telephone terminal and the published represents a number published for a third party as a telephone number of the telephone terminal;
receiving a first call from a first telephone terminal of the plurality of telephone terminals in which a calling number is the real number of the first telephone terminal and a called number is a telephone number of a second telephone terminal of the plurality of telephone terminals;
determining, in response to the first call, the published number corresponding to the real number of the first telephone terminal from the published number storage unit; and
performing a second call to the second telephone terminal in which a calling number is the determined published number of the first telephone terminal; and
performing a relaying process between the first telephone terminal and the second telephone terminal.

14. A telephone relaying method, comprising:
storing in a published number storage unit, for each of a plurality of telephone terminals, a real number and a published number in correlation with each other, wherein the real number represents a telephone number used for directly connecting to the telephone terminal and the published number represents a number published for a third party as a telephone number of the telephone terminal;
receiving a first call from a first telephone terminal of the plurality of telephone terminals in which a calling number is the real number of the first telephone terminal and a called number is a telephone number of a second telephone terminal of the plurality of telephone terminals;

determining, in response to the first call, the published number corresponding to the real number of the first telephone terminal from the published number storage unit;

performing a second call to the second telephone terminal in which a calling number is the determined published number of the first telephone terminal; and performing a relaying process between the first telephone terminal and the second telephone terminal, wherein:

the first call is directly received from the first telephone terminal, in response to receiving the first call, the first call is transmitted to switching equipment that performs a connection process of the first telephone terminal, the first call is returned from the switching equipment, and the second call is performed through the switching equipment.

15. A non-transitory computer-readable storage medium that stores a program that allows a computer to operate as a telephone relaying apparatus and execute a method of relaying telephone calls, the method comprising:

storing in a published number storage unit, for each of a plurality of telephone terminals, a real number and a published number in correlation with each other, wherein the real number represents a telephone number used for directly connecting to the telephone terminal and the published number represents a number published for a third party as a telephone number of the telephone terminal;

receiving a first call from a first telephone terminal of the plurality of telephone terminals in which a calling number is the real number of the first telephone terminal and a called number is a telephone number of a second telephone terminal of the plurality of telephone terminals;

determining, in response to the first call, the published number corresponding to the real number of the first telephone terminal from the published number storage unit;

performing a second call to the second telephone terminal in which a calling number is the determined published number of the first telephone terminal; and performing a relaying process between the first telephone terminal and the second telephone terminal, wherein:

the first call is directly received from the first telephone terminal, in response to receiving the first call, the first call is transmitted to switching equipment that performs a connection process of the first telephone terminal, the first call is returned from the switching equipment, and the second call is performed through the switching equipment.

* * * * *